(12) United States Patent
Takeda et al.

(10) Patent No.: US 7,119,926 B2
(45) Date of Patent: Oct. 10, 2006

(54) DUST AND DIRT DETECTION IN IMAGE READING APPARATUS HAVING ORIGINAL FLOW SCANNING FUNCTION

(75) Inventors: Shoji Takeda, Tokyo (JP); Yoshihito Osari, Chiba (JP); Akinobu Nishikata, Chiba (JP); Nobuo Sekiguchi, Ibaraki (JP); Hidenori Sunada, Ibaraki (JP); Tadaaki Saida, Chiba (JP); Yuichiro Maeda, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1108 days.

(21) Appl. No.: 10/014,109

(22) Filed: Dec. 10, 2001

(65) Prior Publication Data

US 2002/0071135 A1     Jun. 13, 2002

(30) Foreign Application Priority Data

Dec. 12, 2000 (JP) .............................. 2000-378039
Feb. 22, 2001 (JP) .............................. 2001-047162

(51) Int. Cl.
*B41F 1/00* (2006.01)

(52) U.S. Cl. ..................... 358/1.9; 358/3.26; 358/1.14; 358/474; 382/275

(58) Field of Classification Search ................ 358/471, 358/474, 494, 496, 1.9, 3.22, 3.26, 1.14; 382/270, 272, 274, 275
See application file for complete search history.

(56) References Cited

U.S. PATENT DOCUMENTS

| | | | | |
|---|---|---|---|---|
| 6,292,269 B1 * | 9/2001 | Kawai | .......................... | 358/1.9 |
| 6,522,431 B1 * | 2/2003 | Pitts et al. | ................... | 358/474 |
| 6,728,418 B1 * | 4/2004 | Kumagai et al. | ........... | 382/275 |
| 6,750,990 B1 * | 6/2004 | Ohashi | ........................ | 358/496 |
| 6,801,670 B1 * | 10/2004 | Kijima et al. | ................ | 382/274 |
| 6,822,767 B1 * | 11/2004 | Kawano et al. | ............. | 358/496 |
| 6,995,878 B1 * | 2/2006 | Fukuzawa | .................... | 358/474 |

FOREIGN PATENT DOCUMENTS

JP          63-208366          8/1988

(Continued)

OTHER PUBLICATIONS

English Abstract for JPA 6-078147.

(Continued)

*Primary Examiner*—Thomas D. Lee
(74) *Attorney, Agent, or Firm*—Morgan & Finnegan, LLP

(57) ABSTRACT

In an image reading apparatus having a document feeder adapted to convey an original, an image sensor adapted to read the original conveyed to a platen by the document feeder, and a memory adapted to store image data for each pixel, control is executed to cause the image sensor to execute reading at a predetermined position a plurality of number of times without placing any original on the platen while driving the original convey member of the document feeder, the image data of the original output from the image sensor is compared with the image data of a corresponding pixel, which is stored in the memory, every time the original convey member is read, the image data stored in the memory is updated to data having a larger value, and the presence/absence and position of dust and/or dirt on the platen are detected on the basis of the number of times of reading the original convey member and the image data stored in the memory after the end of a plurality of number of times of reading the original convey member.

29 Claims, 27 Drawing Sheets

FOREIGN PATENT DOCUMENTS

| | | |
|---|---|---|
| JP | 02-186870 | 7/1990 |
| JP | 3-295357 | 12/1991 |
| JP | 6-078147 | 3/1994 |
| JP | 08-130616 | 5/1996 |
| JP | 9-135332 | 5/1997 |
| JP | 2000-036908 | 2/2000 |

OTHER PUBLICATIONS

English Abstract for JPA 9-135332.
English Abstract for JPA 63-208366.
English Abstract for JPA 2000-036908.
English Abstract for JPA 3-295357.
English Abstract for JPA 02-186870.
English Abstract for JPA 08-130616.

* cited by examiner

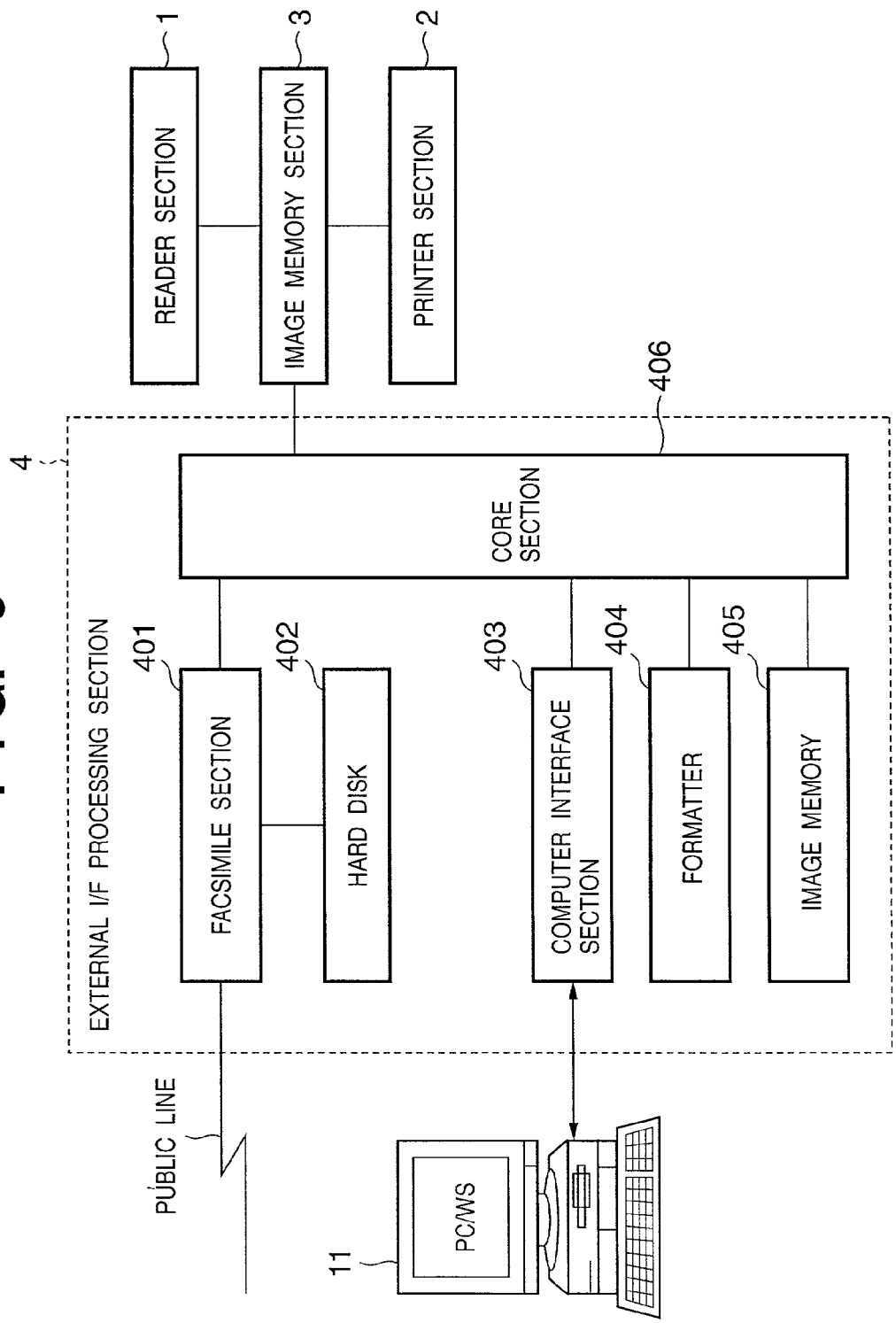

FIG. 27

PLATEN GLASS IS DIRTY. PLEASE CLEAN IT
(TO CLEAN PLATEN GLASS, PLEASE PRESS "CLEAN")

| CLEAN | OK |

DUST AND DIRT DETECTION IN IMAGE READING APPARATUS HAVING ORIGINAL FLOW SCANNING FUNCTION

FIELD OF THE INVENTION

The present invention relates to an image reading apparatus, dust detection method, and control method and image processing method for an image reading apparatus using the dust detection method and, more particularly, to dust and/or dirt detection in an image reading apparatus which reads an original while being fed.

BACKGROUND OF THE INVENTION

Conventionally, there are image reading apparatuses capable of reading an original in two different ways, i.e., reading an original stationarily placed on a platen glass by moving a scanner (referred to as "stationary reading operation" hereinafter), and reading an original by a scanner at a fixed position while feeding the original along the platen glass by an automatic document feeder (referred to as "read-while-feed operation" hereinafter) are known. This read-while-feed operation can shorten the reading time of entire originals as compared to the stationary reading method because original exchange and reading can be simultaneously performed, and the image reading section need not be returned to the home position to read the next original.

In the above-described read-while-feed operation, however, since an original image is read at a fixed position on the platen glass, black streaks may be formed on the read image due to dust or dirt between the platen glass and the original or on the lower surface of the platen glass, and an original image can not be read properly. Hence, detecting of dust and/or dirt sticking to the platen glass (referred to as "dust detection") is executed to prevent any abnormal image reading due to dust and/or dirt on the platen glass.

In detecting dust and/or dirt in an image reading apparatus, having the above arrangement, with a function of conveying an original to be read to the reading position using a conveyor belt, normally, the density of the white conveyor belt is partially sampled first to obtain the average density and determine a threshold value. The threshold value is compared with read data to detect dust and/or dirt. This dust detection operation is executed a plurality of number of times, and the number of times of detection of the dust and/or dirt at each pixel position is counted, thereby determining dust and/or dirt.

However, to obtain the average density of the conveyor belt, a memory for storing sampling data is necessary. Additionally, a line memory is also necessary to count dust and/or dirt at each pixel. The number of times of sampling is limited within the range of the number of bits of the line memory. That is, for more accurate dust detection, the memory capacity must be large.

Furthermore, in the above-described dust detection method using a conveyor belt, if the conveyor belt surface is dirty, dirt on the original glass plate surface cannot be normally detected.

As described above, the dust detection method using image data from an image reading element depends on dirt on the conveyor belt or convey roller surface of the original convey section. If not the platen glass but the conveyor belt or roller is dirty, an image is read from the image reading element as if the platen glass surface were dirty.

SUMMARY OF THE INVENTION

The present invention has been made in consideration of the above situation, and has as its object to execute accurate dust detection using a smaller memory capacity in an image reading apparatus capable of performing read-while-feed operation.

According to the present invention, the foregoing object is attained by providing an image reading apparatus comprising: a document feeder adapted to convey an original; an image sensor adapted to read the original conveyed to a platen by the document feeder; a memory adapted to store image data for each pixel; a controller adapted to control the image sensor to execute reading at a predetermined position a plurality of number of times without placing any original on the platen while driving an original convey member of the document feeder; a comparator adapted to compare image data of the original output from the image sensor with image data of a corresponding pixel, which is stored in the memory, every time the original convey member is read, and update the image data stored in the memory to data having a larger value; and a detector adapted to detect a presence/absence and position of dust and dirt on the platen on the basis of the number of times of reading the original convey member and the image data stored in the memory after the end of a plurality of number of times of reading the original convey member.

According to the present invention, the foregoing object is also attained by providing an image reading apparatus comprising: a document feeder adapted to convey an original; an image sensor adapted to read the original conveyed to a platen by the document feeder; a controller adapted to control the image sensor to execute reading at a predetermined position a plurality of number of times without placing any original on the platen while driving an original convey member of the document feeder; an adder adapted to add for each pixel image data of the original convey member read the plurality of number of times; a memory adapted to store for each pixel the image data added by the adder; a determination unit adapted to determine a threshold value on the basis of the number of times of reading the original convey member and the image data stored in the memory; and a detector adapted to detect a presence/absence and position of dust and dirt on the platen on the basis of the threshold value and image data output from the image sensor without placing any original on the platen.

The foregoing object is also attained by providing a dust detection method in an image reading apparatus having a document feeder adapted to convey an original, an image sensor adapted to read the original conveyed to a platen by the document feeder, and a memory adapted to store image data for each pixel, comprising: controlling the image sensor to execute reading at a predetermined position a plurality of number of times without placing any original on the platen while driving an original convey member of the document feeder; comparing image data of the original output from the image sensor with image data of a corresponding pixel, which is stored in the memory, every time the original convey member is read; updating the image data stored in the memory to data having a larger value on the basis of a comparison result; and detecting a presence/absence and position of dust and dirt on the platen on the basis of the number of times of reading the original convey member and the image data stored in the memory after the end of a plurality of number of times of reading the original convey member.

Further, the foregoing object is also attained by providing a dust detection method in an image reading apparatus having a document feeder adapted to convey an original, and an image sensor adapted to read the original conveyed to a platen by the document feeder, comprising: controlling the image sensor to execute reading at a predetermined position a plurality of number of times without placing any original on the platen while driving an original convey member of the document feeder; adding for each pixel image data of the original convey member read the plurality of number of times; storing for each pixel the added image data in a memory; determining a threshold value on the basis of the number of times of reading the original convey member and the image data stored in the memory; and detecting a presence/absence and position of dust and dirt on the platen on the basis of the threshold value and image data output from the image sensor without placing any original on the platen.

According to the present invention, a plurality of white data in a non-image portion are sampled, and only the maximum value is held. Since no white data is read in a dust region, any threshold value need not be determined from the average density. Hence, processing can be simplified, and the memory can be omitted.

In addition, since the limitation on the number of times of sampling, which is determined by the bit width of the memory, can be eliminated, sampling can be executed more times. Hence, a decrease in memory capacity and accurate dust detection by eliminating the limitation on the number of times of sampling can be simultaneously realized.

It is the second object of the present invention to provide a control method and image processing method for an image reading apparatus that executes the above dust detection method.

According to the present invention, the foregoing second object is attained by providing a control method for the image reading apparatus which executes the foregoing dust detection method, wherein when the dust or dirt is detected, a position of the image sensor is moved, and the dust detection method is repeatedly executed.

Further, according to the present invention, the foregoing second object is also attained by providing a control method for the image reading apparatus which executes the foregoing dust detection method, wherein the image reading apparatus has a first reading mode in which a position of the image sensor is fixed, and the original is read while being conveyed by the document feeder and a second reading mode in which the original is stationarily held on the platen and read while moving the image sensor, and the method comprises: moving the image sensor to one of a plurality of predetermined positions when the dust or dirt is detected, and repeatedly executing the dust detection method, and inhibiting the first reading mode and setting the second reading mode when the dust or dirt is detected at all of the plurality of positions.

Furthermore, the foregoing second object is also attained by providing a control method for the image reading apparatus which executes the foregoing dust detection method, wherein when the dust or dirt is detected, a position of the image sensor is moved, and the dust detection method is repeatedly executed.

Further, the foregoing second object is also attained by providing a control method for the image reading apparatus which executes the foregoing dust detection method, wherein the image reading apparatus has a first reading mode in which a position of the image sensor is fixed, and the original is read while being conveyed by the document feeder and a second reading mode in which the original is stationarily held on the platen and read while moving the image sensor, and the method comprises: moving the image sensor to one of a plurality of predetermined positions when the dust or dirt is detected, and repeatedly executing the dust detection method, and inhibiting the first reading mode and setting the second reading mode when the dust or dirt is detected at all of the plurality of positions.

Further, the foregoing second object is also attained by providing an image processing method in the image reading apparatus which executes the foregoing dust detection method, comprising replacing pixel data corresponding to a position of the detected dust or dirt with pixel data of a pixel position adjacent to the position of the dust or dirt.

Further, the foregoing second object is also attained by providing an image processing method in the image reading apparatus which executes the foregoing dust detection method, comprising replacing pixel data corresponding to a position of the detected dust or dirt with pixel data input for an immediately preceding pixel.

Further, the foregoing second object is also attained by providing an image processing method in the image reading apparatus which executes the foregoing dust detection method, comprising replacing pixel data corresponding to a position of the detected dust or dirt with pixel data of a pixel position adjacent to the position of the dust or dirt.

Further, the foregoing second object is also attained by providing an image processing method in the image reading apparatus which executes the foregoing dust detection method, comprising replacing pixel data corresponding to a position of the detected dust or dirt with pixel data input for an immediately preceding pixel.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a block diagram showing the arrangement of an external I/F processing section according to the embodiment of the present invention;

FIG. 27 is a view showing alarm display on an operation unit according to the third embodiment of the present invention.

DETAILED DESCRIPTION OF THE PREFERRED EMBODIMENTS

Preferred embodiments of the present invention will be described in detail in accordance with the accompanying drawings.

<First Embodiment>

As an image reading apparatus according to the present invention, a digital copying machine will be described below.

Figure 1:
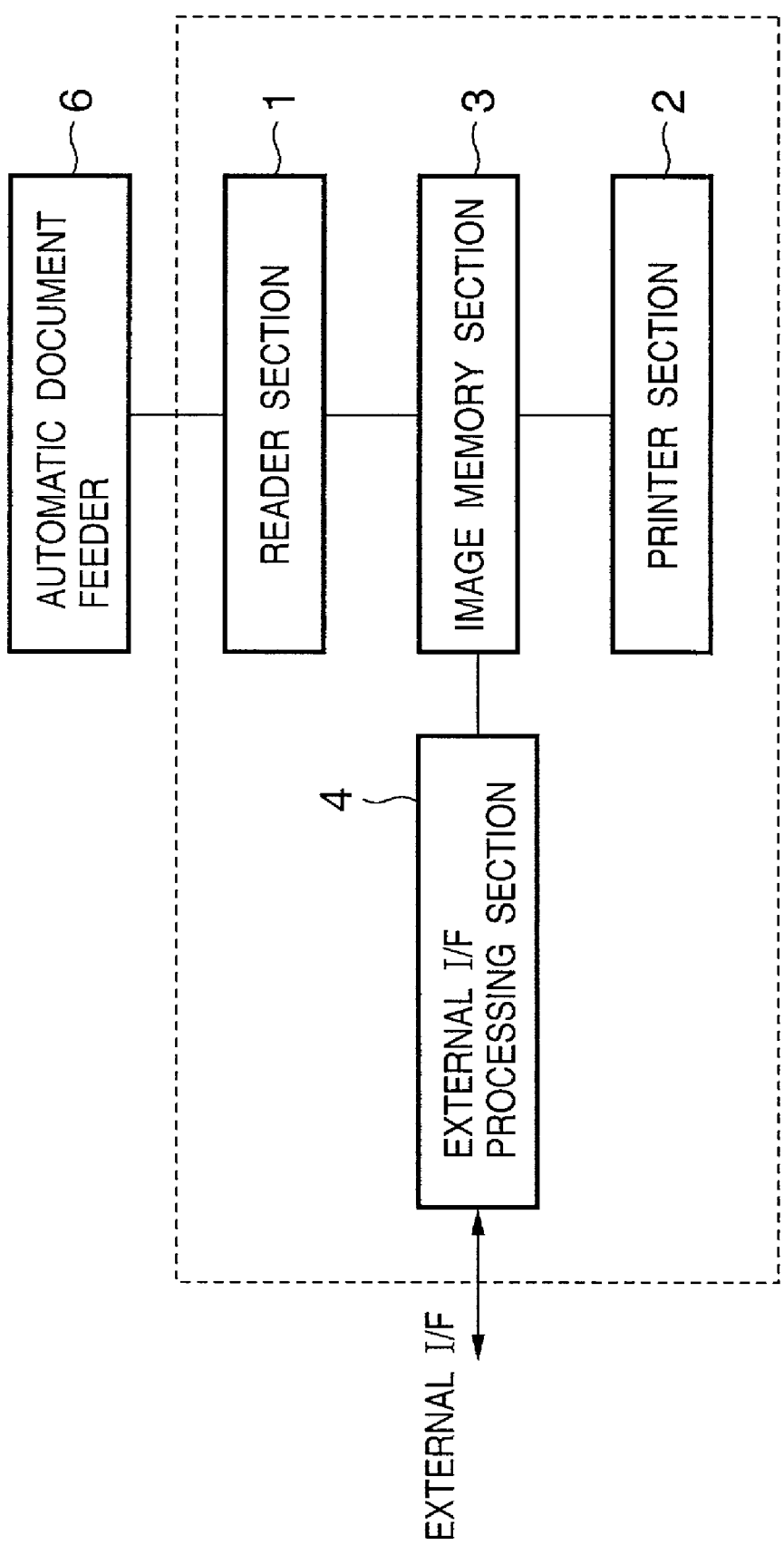
FIG. 1 is a block diagram showing an arrangement of a digital copying machine according to an embodiment of the present invention.

FIG. 1 is a block diagram showing the arrangement of a digital copying machine according to the first embodiment of the present invention. A reader section 1 reads the image of an original and outputs image data corresponding to the original image to an image memory section 3. A printer section 2 prints an image corresponding to the image data from the image memory section 3 on printing paper. The image memory section 3 compresses the image data transferred from the reader section 1 and stores the compressed image data, or expands the stored compressed image data and transfers the expanded image data to the printer section 2. The image memory section 3 also transfers stored image data to an external I/F processing section 4 or stores image data transferred from the external I/F processing section 4.

The external I/F processing section 4 executes predetermined processing for the image data transferred from the image memory section 3 and outputs the image data to an external device, or executes predetermined processing for image data sent from the external device and transfers the image data to the image memory section 3. An automatic document feeder 6 is connected to the reader section 1 to feed a placed original to a predetermined position.

Figure 2:
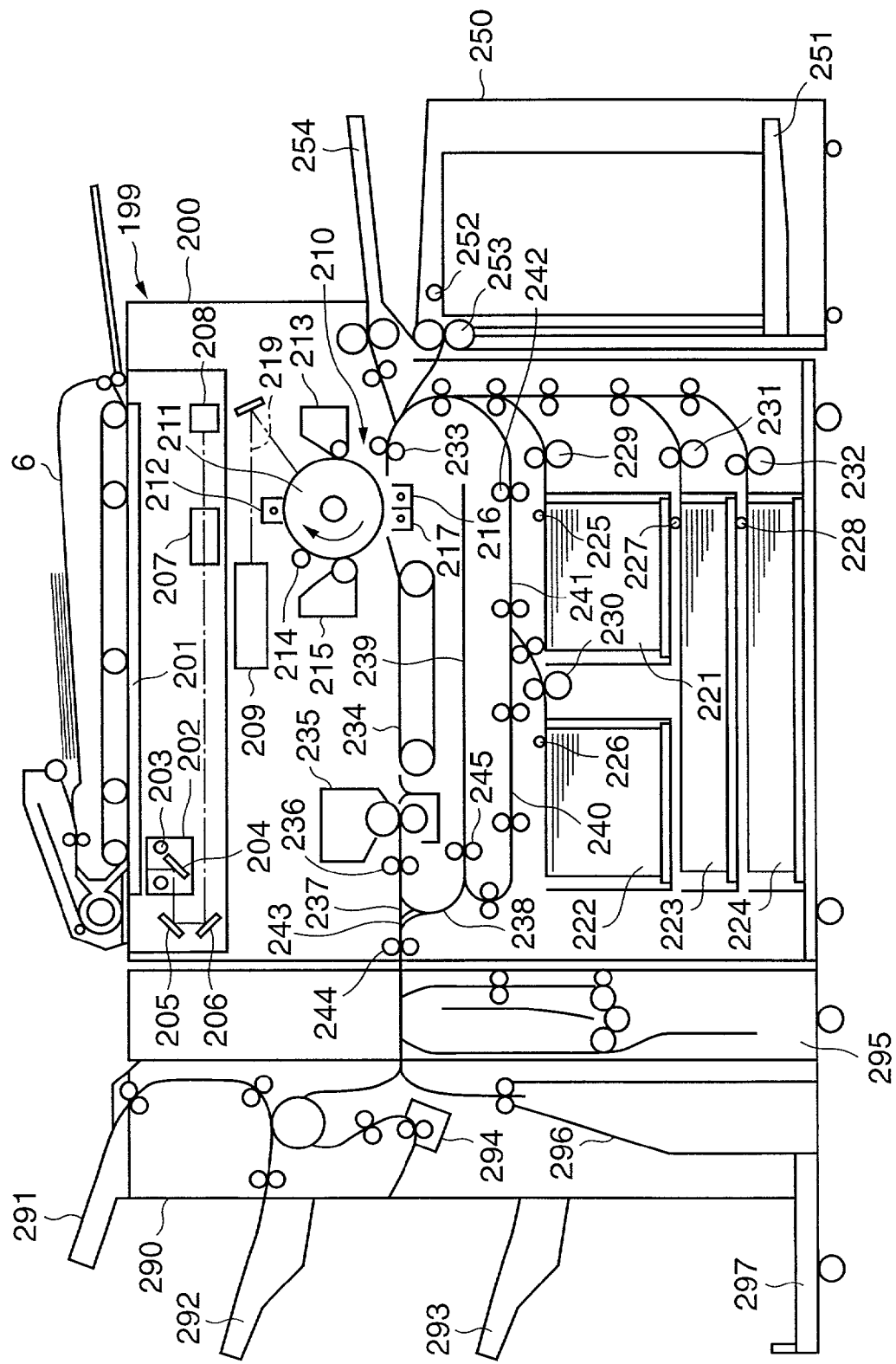
FIG. 2 is a sectional view of the digital copying machine according to the embodiment of the present invention.

FIG. 2 is a sectional view showing the digital copying machine of the present invention. Referring to FIG. 2, reference numeral 200 denotes a main body of a digital copying machine 199; 6, the automatic document feeder; 201, a platen glass serving as a platen; and 202, a scanner constituted by an original illumination lamp 203, scanning mirror 204, and the like. The scanner 202 is reciprocally moved by a motor (not shown) to send reflected light from an original through the scanning mirrors 204 to 206 and a lens 207, thereby forming an image on a CCD sensor in an image sensor 208.

An exposure control section 209 formed from a laser, polygon scanner, and the like irradiates an electrostatic drum 211 with a laser beam 219 that is modulated on the basis of an image signal converted into an electrical signal and has undergone predetermined image processing (to be described later) by the image sensor 208. A primary charger 212, developing unit 213, transfer charger 216, separation charger 217, pre-exposure lamp 214, and cleaning unit 215 are arranged around the electrostatic drum 211.

In an image forming unit 210, the electrostatic drum 211 is rotated by a motor (not shown) in a direction indicated by an arrow in FIG. 2. The electrostatic drum 211 is charged to a desired potential by the primary charger 212 and then irradiated with the laser beam 219 from the exposure control section 209 so that an electrostatic latent image is formed. The electrostatic latent image formed on the electrostatic drum 211 is developed by the developing unit 213 and converted into a visible toner image.

On the other hand, a transfer paper sheet fed from a right cassette deck 221, left cassette deck 222, upper cassette 223, or lower cassette 224 by a pickup roller 225, 226, 227, or 228 is fed to the main body by feed rollers 229, 230, 231, or 232, and fed to a transfer belt by registration rollers 233. The visible toner image is transferred onto the transfer paper sheet by the transfer charger 216.

After transfer, residual toner on the electrostatic drum 211 is cleaned by the cleaning unit 215, and residual charges are erased by the pre-exposure lamp 214. After transfer, the transfer paper sheet is separated from the electrostatic drum 211 by the separation charger 217 and fed to a fixer 235 by a transfer belt 234. The transfer paper sheet is pressed and heated by the fixer 235 to fix the toner image and then discharged outside the main body 200 by discharge rollers 236.

A deck 250 capable of storing, e.g., about 4,000 transfer paper sheets is arranged on the right side of the main body 200. A lifter 251 of the deck 250 moves upward in accordance with the amount of transfer paper such that a transfer paper sheet always abuts against a pickup roller 252. The transfer paper sheet is fed to the main body by feed rollers 253. A multiple manual feed tray 254 capable of storing 100 transfer paper sheets is also arranged. Further, a discharge flapper 237 switches between a convey path 238 and a discharge path 243.

Reference numeral 240 denotes a lower convey path. A transfer paper sheet fed from the discharge rollers 236 is turned and guided to a re-feed path 241 through an inverting path 239. A transfer paper sheet fed from the left cassette deck 222 by the feed rollers 230 is also guided to the re-feed path 241. Re-feed rollers 242 re-feeds a transfer paper sheet to the image forming unit 210.

Discharge rollers 244 arranged near the discharge flapper 237 discharge a transfer paper sheet passed through the discharge path 243 from the copying machine. In a double-side printing (double-side copy) mode, the discharge flapper 237 is moved upward to guide a printed transfer paper sheet to the re-feed path 241 through the convey path 238, inverting path 239, and lower convey path 240. At this time, the transfer paper sheet is pulled into the inverting path 239 by inverting rollers 245 until the trailing edge of the transfer paper sheet is completely removed from the convey path 238, and the transfer paper sheet engages with the inverting rollers 245. Then, the inverting rollers 245 are rotated in reverse directions to send the transfer paper sheet to the lower convey path 240.

To invert and discharge a transfer paper sheet from the main body, the discharge flapper 237 is moved upward. The transfer paper sheet is pulled into the inverting path 239 by the inverting rollers 245 while leaving the trailing edge of the transfer paper sheet in the convey path 238. Then, the inverting rollers 245 are rotated in reverse directions to turn the transfer paper sheet and send it to the discharge roller 244.

In a discharge processing unit 290, transfer paper sheets discharged from the main body 200 of the digital copying machine one by one are stacked and aligned on a processing tray 294. When a set of paper sheets is discharged, the transfer paper sheets are stapled and discharged to a discharge tray 292 or 293. The discharge tray 293 is moved upward or downward by a motor (not shown) to the processing tray position before the start of image forming operation. Partition paper sheets to be inserted between discharged transfer paper sheets are stacked on a paper tray 291. A Z-folder 295 Z-folds discharged transfer paper sheets. A binder 296 folds a set of discharged transfer paper sheets at the center and stables the sheets to bind them. The bound paper sheets are discharged to a discharge tray 297.

Figure 3:
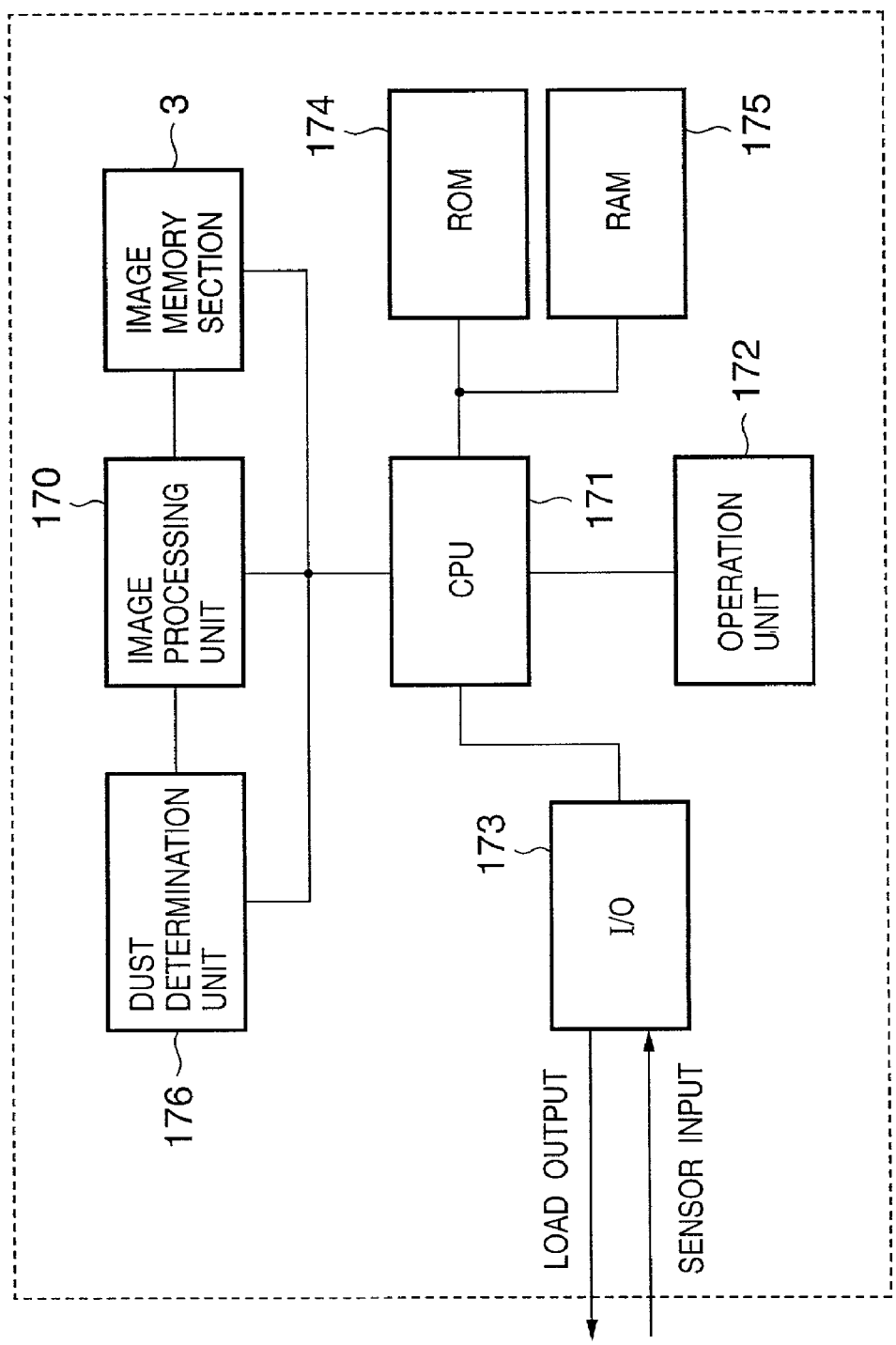
FIG. 3 is a block diagram showing control functions of the digital copying machine according to the embodiment of the present invention.

FIG. 3 is a control block diagram in the digital copying machine 199. Referring to FIG. 3, a CPU 171 executes basic control of the digital copying machine 199. A ROM 174 with a control program written, a work RAM 175 used to execute processing, and an input/output port 173 are connected to the CPU 171 through address and data buses. The input/output port 173 is connected to various kinds of loads (not shown) for controlling the digital copying machine 199, such as a motor and clutch, and the input (not shown) of a sensor for detecting the paper position.

The CPU 171 sequentially controls input/output through the input/output port 173 in accordance with the contents of the ROM 174, thereby executing image forming operation. An operation unit 172 is connected to the CPU 171. The CPU 171 controls a display unit and key input unit of the operation unit 172. An operator instructs the CPU 171 to switch display between the image forming mode, the scanner reading mode, and the print output mode through the key input unit. The CPU 171 displays the state of the digital copying machine 199 and operation mode setting by key input.

The CPU 171 is connected to an image processing unit 170 for processing a signal converted into an electrical signal by the image sensor 208, the image memory section 3 for storing a processed image, and a dust determination unit 176 for detecting dust and/or dirt on the platen glass 201 from a signal digitized by the image processing unit 170.

Image processing operation will be described next with reference to FIG. 4.

Figure 4:
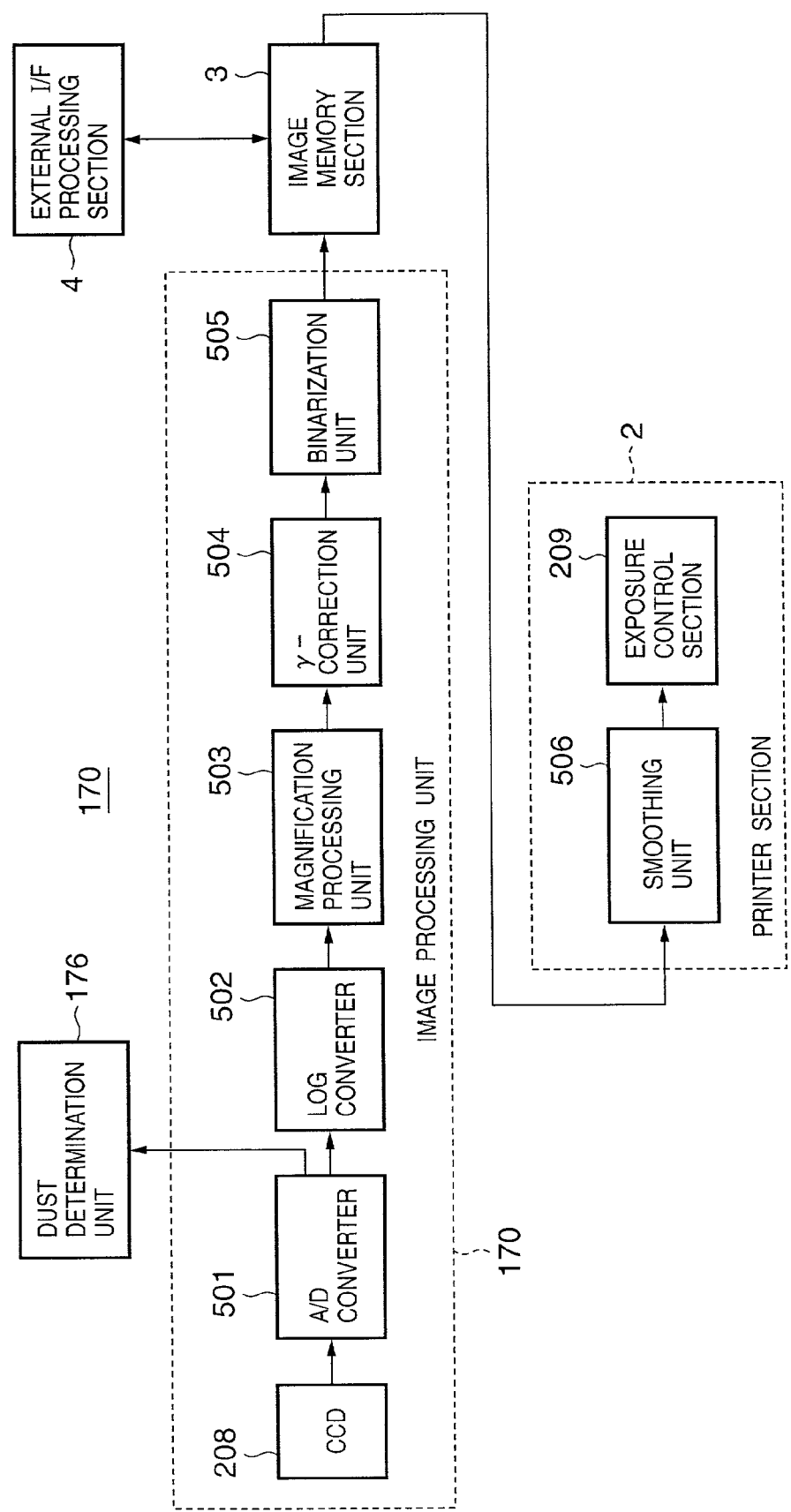
FIG. 4 is a block diagram showing the arrangement of an image processing unit according to the embodiment of the present invention.

FIG. 4 is a block diagram showing the arrangement for image processing. An original image formed on the CCD sensor 208 through the lens 207 is input as luminance data of black and converted into an analog electrical signal by the CCD sensor 208. The converted image information is input to an analog signal processor (not shown), subjected to sample-and-hold and dark level correction, and A/D-converted by an A/D converter 501. The digitized signal is subjected to shading correction (variation in sensor for reading the original and the light distribution characteristic of the original illumination lamp are corrected).

After that, the signal is sent to a log converter 502. The log converter 502 stores an LUT used to convert received luminance data into density data. The luminance data is converted into density data by outputting a table value corresponding to the received data. The image is changed to a desired magnification by a magnification processing unit 503 and input to a γ-correction unit 504. In outputting the density data, the γ-correction unit 504 executes conversion in consideration of the characteristics of the printer and adjusts the output in accordance with the density value set by the operation unit 172.

Then, the data is sent to a binarization unit 505. The multilevel density data is binarized by the binarization unit 505 so that the density value becomes "0" or "255". The 8-bit image data is binarized to 1-bit image data "0" or "1", so the amount of image data stored in the memory becomes small. However, when an image is binarized, the number of grayscale levels of the image decreases from 256 to 2. For this reason, when halftone image data such as a photographed image is binarized, generally, the image greatly degrades. To prevent this, pseudo halftoning using binary data is necessary.

As a pseudo halftoning technique using binary data, an error diffusion method is used. In this method, when the density of an image is larger than a threshold value, the image is defined as density data "255". If the density is equal to or smaller than the threshold value, the image is defined as density data "0". After binarization is executed in this way, the difference between the actual density data and the binary data is distributed to peripheral pixels as an error signal. To distribute an error, an error generated by binarization is multiplied by a weight coefficient on a matrix prepared in advance and added to the peripheral pixels. With this processing, the average density value of the entire image is maintained, and a pseudo-halftone image can be expressed by binary data.

The binarized image data is sent to the image memory section 3 and stored. Image data input from a computer or the like through the external I/F processing section 4 is processed by the external I/F processing section 4 as binary image data and therefore directly sent to the image memory section 3. The image memory section 3 has a high-speed page memory and a large-capacity memory (hard disk) capable of storing image data of a plurality of pages.

Image data of a plurality of pages stored in the hard disk are output in accordance with an editing mode designated by the operation unit 172 of the digital copying machine 199. In, e.g., a sort mode, the read image data of originals fed from the automatic document feeder 6 are sequentially output. The image data of each original, which is temporarily stored, is read out from the hard disk. This operation is repeated a plurality of number of times to output the image data. With this operation, the same function as that of a sorter having a plurality of bins can be realized.

The image data output from the image memory section 3 is sent to a smoothing unit 506 in the printer section 2. The smoothing unit 506 interpolates the data such that the binarized image has smooth line edge portions and outputs the image data to the exposure control section 209. The exposure control section 209 performs the above-described processing to form the image data on a transfer paper sheet.

Figure 5:
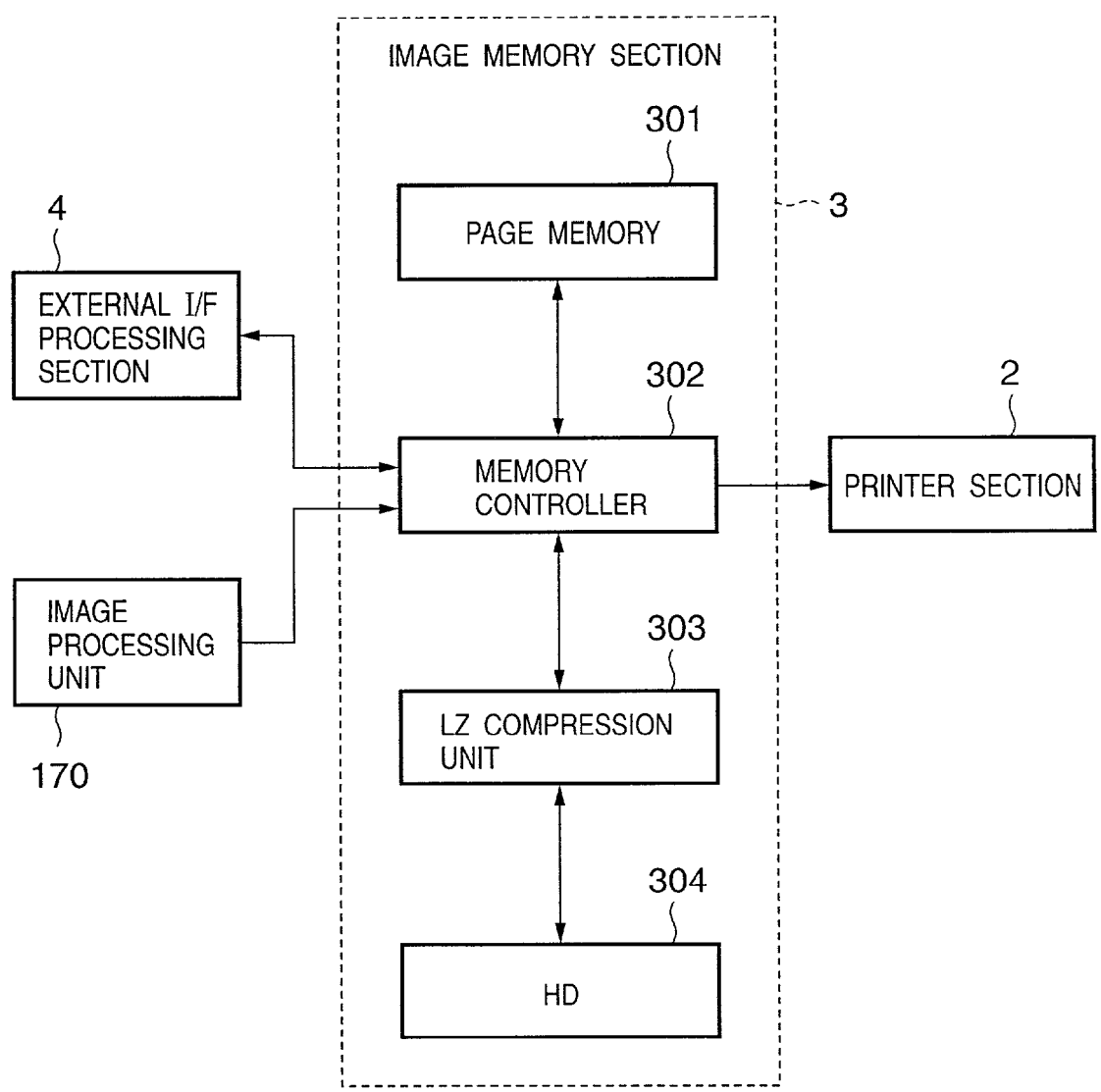
FIG. 5 is a block diagram showing the arrangement of an image memory section according to the embodiment of the present invention.

FIG. 5 is a block diagram showing the arrangement of the image memory section 3. In the image memory section 3, a page memory 301 formed from a memory such as a DRAM is accessed to write a binary image from the external I/F processing section 4 or image processing unit 170, to read out an image to the printer section 2, or input/output an image to/from a hard disk (HD) 304 serving as a large-capacity storage device through a memory controller 302. Reference numeral 303 denotes an LZ (Lempel Ziv) compression unit.

The memory controller 302 generates a DRAM refresh signal for the page memory 301 and also arbitrates access from the external I/F processing section 4, image processing unit 170, and hard disk 304 to the page memory 301. The memory controller 302 also controls the write address to the page memory 301, the read address from the page memory 301, and read direction in accordance with an instruction from the CPU 171. The CPU 171 controls a function of arranging and laying out a plurality of original images in the page memory 301 and outputting them to the printer section 2, a function of extracting and outputting part of an image, or an image rotating function.

FIG. 6 is a block diagram showing the arrangement of the external I/F processing section 4. As described above, the external I/F processing section 4 loads binary image data from the reader section 1 through the image memory section 3 or outputs binary image data from the external I/F to the printer section 2 through the image memory section 3 to form an image. The external I/F processing section 4 has a core section 406, a facsimile section 401, a hard disk 402 for storing communication image data of the facsimile section 401, a computer interface section 403 connected to an external computer 11, a formatter 404, and an image memory 405.

The facsimile section 401 is connected to a public line through a modem (not shown) to receive facsimile communication data from the public line and transmit facsimile communication data to the public line. To execute facsimile transmission at a designated time or to transmit image data in accordance with a designated password inquiry from the other party as a facsimile function, the facsimile section 401 stores a facsimile image in the hard disk 402 and processes the image data. With this arrangement, once an image is transferred from the reader section 1 to the facsimile section 401 or hard disk 402 for facsimile through the image memory section 3, facsimile transmission can be executed without using the reader section 1 and image memory section 3 for the facsimile function.

The computer interface section 403 is an interface section for executing data communication with the external computer 11 and has a local area network (to be referred to as a LAN hereinafter), a serial I/F, a SCSI I/F, and a centronics I/F for inputting data to the printer. Through this I/F section, the external computer 11 is notified of the state of the printer section 2 or reader section 1, or an image read by the reader section 1 is transferred to the external computer 11 in accordance with an instruction from the computer. In addition, print image data is received from the external computer 11.

Since print data sent from the external computer 11 through the computer interface section 403 is described in a dedicated printer code, the formatter 404 converts the code into raster image data for image formation by the printer section 2 through the image memory section 3. The formatter 404 rasterizes the raster image data on the image memory 405.

The image memory 405 is used by the formatter 404 to rasterize the raster image data. Alternatively, in sending an image read by the reader section 1 to the external computer 11 through the computer interface section 403 (image scanner function), the image data sent from the image memory section 3 is temporarily rasterized on the image memory 405, converted into a data format to be sent to the external computer 11, and sent from the computer interface section 403.

The core section 406 manages data transfer between the facsimile section 401, computer interface section 403, formatter 404, image memory 405, and image memory section 3. Even when the external I/F processing section 4 has a plurality of image output sections, or even when only a single image transfer path to the image memory section 3 is prepared, exclusive control and priority control are executed to output an image under the management by the core section 406.

The operation of the automatic document feeder of the present invention will be described next with reference to FIGS. 7A to 10B. First, the respective sections of the automatic document feeder will be described with reference to FIG. 7A.

A feed roller 601 drops on the original surface of originals 621, including at least one sheet, placed on an original tray 620, and rotates to feed an uppermost original D of the originals. Before the start of feeding of originals, a stopper

Figure 7A:
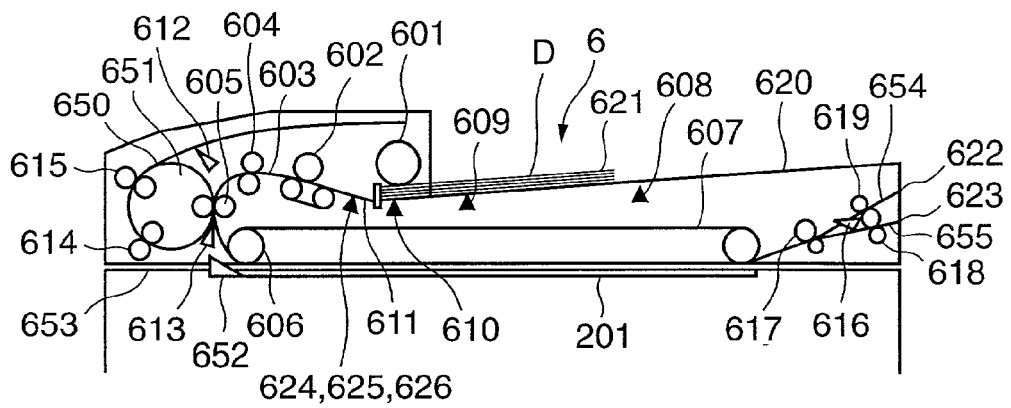
FIGS. 7A to 7D are schematic sectional views of an automatic document feeder according to the embodiment of the present invention for explaining original feeding operation.

611 projects as shown in FIG. 7A, so that the originals 621 are regulated by the stopper 611 and prevented from moving downstream.

Originals fed by the feed roller 601 are separated into one sheet by the function of separation rollers 602 and separation belt 603. This separation is realized by a known retard separation technique. Convey rollers 604 conveys the original separated by the separation rollers 602 and separation belt 603 to registration rollers 605 and makes the original abut against the registration rollers 605 to form a loop, thereby eliminating sheet skews in conveying the original. An inverting feed flapper 613 for guiding the original that has passed between the registration rollers 605 to a feed path 652 serving as a convey path to the platen 201 or an inverting inlet path 653 is arranged under the registration rollers 605.

Both first inverting rollers 614 and second inverting rollers 615 rotate to invert the original. An inverting flapper 612 guides the original from the direction of the second inverting rollers 615 to an inverting path 650 or re-feed path 651. A belt drive roller 606 drives a feed belt 607 for placing the original on the platen. The feed belt 607 abuts against the platen 201. Feed/discharge rollers 617 feed or discharge an original supplied from a manual feed port 622 or discharge the original D feed by the feed belt 607 to an original discharge port 623.

A discharge flapper 616 guides an original to a manual feed/discharge path 654 or original discharge path 655. In discharging an original, the discharge flapper 616 acts to prevent the original from being discharged to the manual feed port 622. A manual feed/discharge roller 619 feeds or discharges a manually fed original. A discharge roller 618 discharges an original. Three sensors 608, 609, and 610 are arranged under the original tray 620.

The original set detection sensor 610 is a transmission-type optical sensor for detecting that the originals 621 has been set. The original trailing-edge detection sensor 608 is a reflection-type optical sensor for determining whether the original is a half-size original. The last original detection sensor 609 arranged between the original set detection sensor 610 and the original trailing-edge detection sensor 608 is a reflection-type optical sensor for determining whether the original that is being conveyed is the last original.

Original size detection sensors 624, 625, and 626 detect the size of the original that is being conveyed. The three sensors are arrayed in the direction of width of the original. The width of the original is detected at three stages on the basis of three sensor values so it can be determined whether the original is of a A size system or a B size system, or the width of the original such as A4 or A5 can be discriminated. Even when the originals contains paper sheets of different sizes, the sizes of the originals can be individually detected. In this case, the originals must be placed while aligning the "deep" edges in the original width direction.

The operation of the automatic document feeder in reading both surfaces of an original (double-sided original) having printed surfaces on both sides will be described next. Referring to FIGS. 7B to 8D, f indicates the leading edge of an original, and e indicates the trailing edge of the original.

Figure 7B:
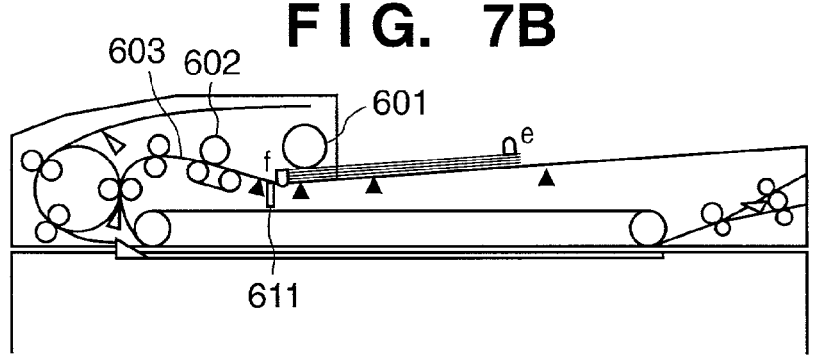
Figure 7C:
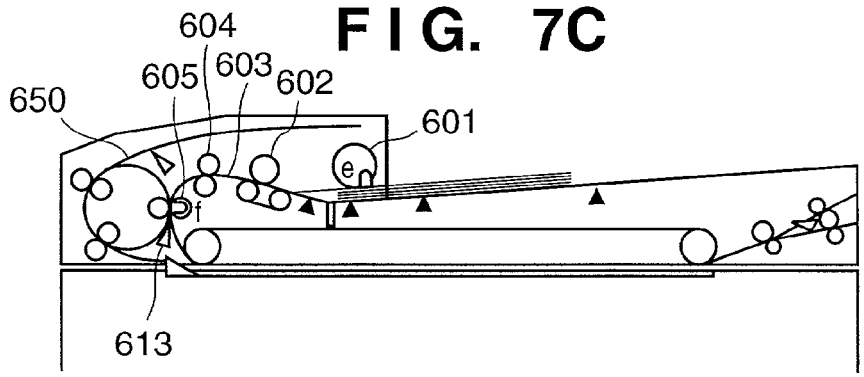

When a double-sided original feed instruction is issued to the automatic document feeder 6, the stopper 611 moves downward, and the feed roller 601 drops onto originals (FIG. 7B). Only the uppermost original is separated from the rest of originals 621 by the functions of the feed roller 601, separation rollers 602, separation belt 603, and convey rollers 604 and fed to the registration rollers 605 (FIG. 7C). At this time, the inverting feed flapper 613 is set in a direction to convey the original to the inverting path 650.

Figure 7D:
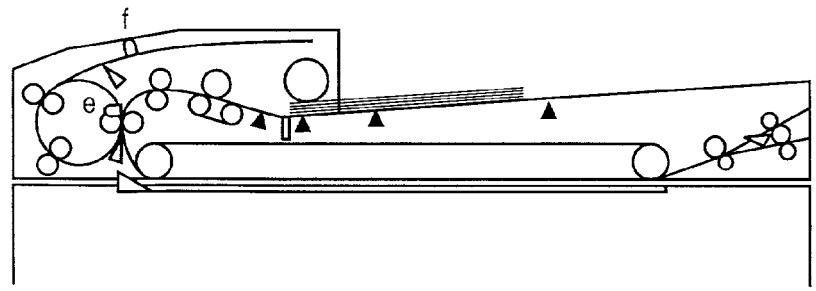
Figure 8A:
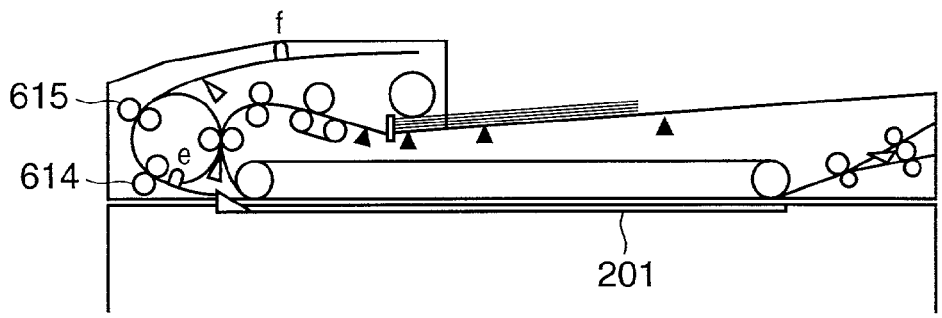
FIGS. 8A to 8D are schematic sectional views of the automatic document feeder according to the embodiment of the present invention for explaining original feeding operation.
Figure 8B:
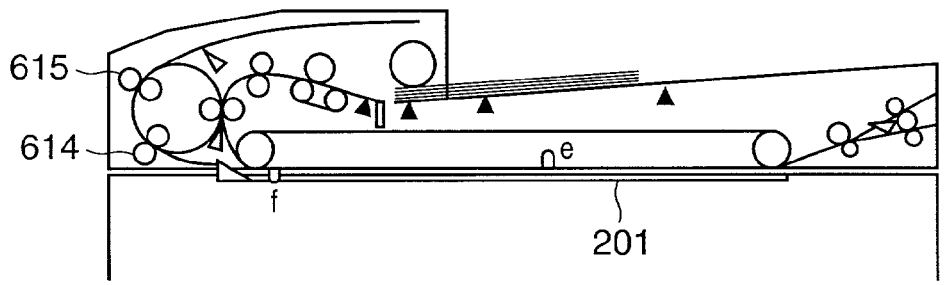
Figure 8C:
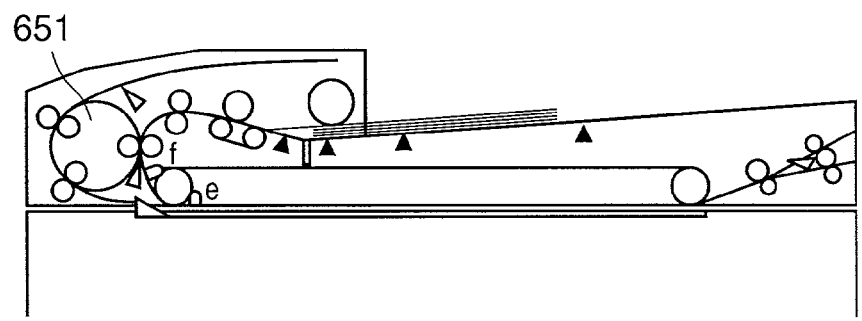
Figure 8D:
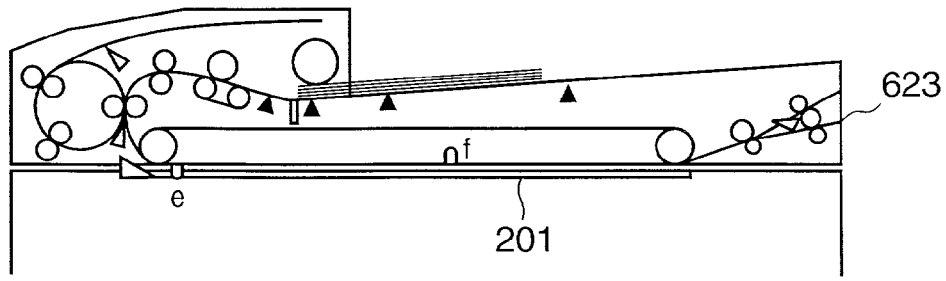

When the registration rollers 605 rotate, the original is conveyed to the position shown in FIG. 8A through the path shown in FIG. 7D. At this time, the drive directions of the first inverting rollers 614 and second inverting rollers 615 are reversed. The original is fed onto the platen 201 and stops at the position shown in FIG. 8B. When reading of the original is ended, the original is turned through the re-feed path 651, as shown in FIG. 8C, and fed onto the platen 201 again, as shown in FIG. 8D.

When reading of the original is ended, the original is fed to the right and discharged from the automatic document feeder 6 through the original discharge port 623. By repeating the above operation, the automatic document feeder 6 can separate double-sided originals one by one from the uppermost original, read both surfaces, and discharge the original while facing the upper surface down.

Next, the operation of original reading scheme (flow scanning) in which the scanner 202 is fixed at a predetermined position, and an image is read while moving an original (read-while-feed operation) will be described for both a case wherein originals contains only small-size originals and a case wherein originals contains a large-size original. In this embodiment, a small-size original means an original that is not detected by the original trailing-edge detection sensor 608 when the originals 621 are placed on the original tray 620, e.g., A4 size or letter size. A large-size original means an original that is detected by the original trailing-edge detection sensor 608 when the originals 621 is placed on the original tray 620, e.g., A3 size or 11×17 size.

A read-while-feed operation of small-size originals will be described below.

Figure 9A:
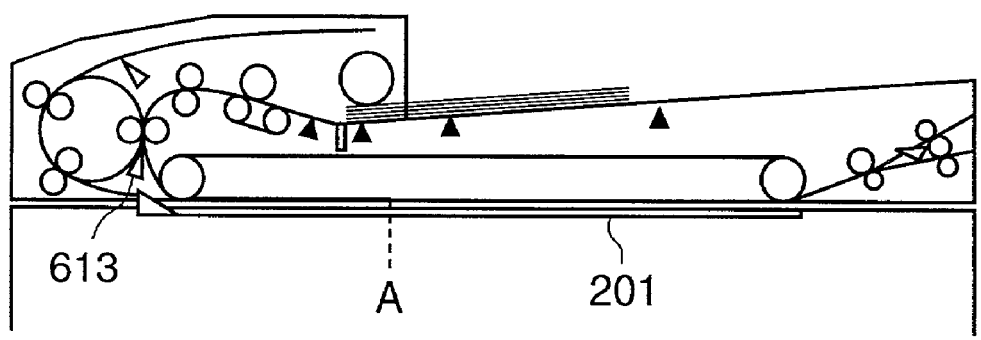
FIGS. 9A to 9C are schematic sectional views of the automatic document feeder according to the embodiment of the present invention for explaining original feeding operation.
Figure 9B:
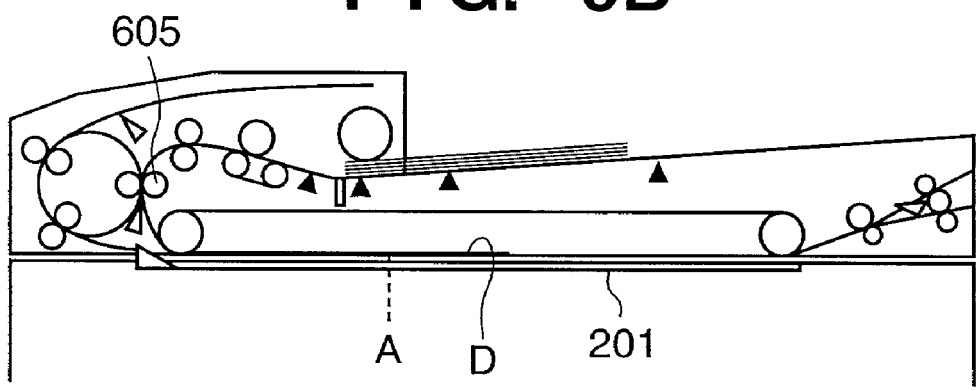

The operation until an original reaches the registration rollers 605 is the same as that described with reference to FIGS. 7A to 7C. In the read-while-feed operation, the original is further guided onto the platen 201 by the inverting feed flapper 613, as shown in FIG. 9A. The original is conveyed on a point A in FIG. 9A at a predetermined speed. The image of the original is read by the scanner 202 which is standing by under the point A (FIG. 9B). At this time, at the timing when the leading edge of the original passes through the point A, a reading start signal is sent to the reader section 1.

Figure 9C:
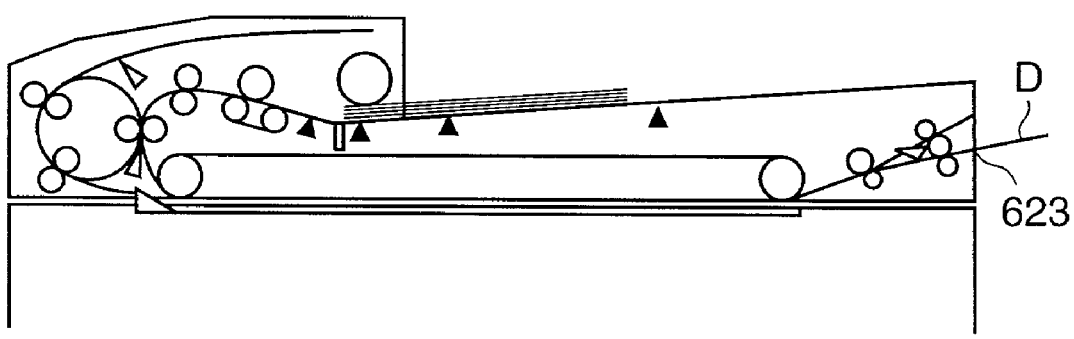

The read original is conveyed to the right in FIG. 9B and discharged from the automatic document feeder 6 through the original discharge port 623 (FIG. 9C). The point A is formed from six sub-points A0, A1, A2, A3, A4, and A5 in this embodiment. A position at which the trailing edge of an original of letter size passes through the registration rollers 605 is defined as A0, and A1, A2, . . . are defined in 0.5-mm increments from the point A0 to the right. A readable position determined by dust determination (to be described later) is stored, and in the reading mode, the scanner 202 and automatic document feeder 6 are instructed to execute reading at the stored position.

Figure 10A:
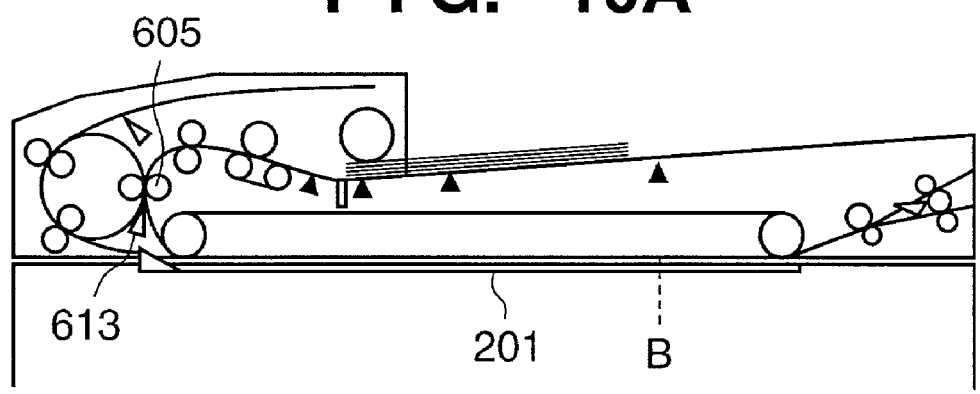
FIGS. 10A and 10B are schematic sectional views of the automatic document feeder according to the embodiment of the present invention for explaining original feeding operation.

A read-while-feed operation of originals including a large-size original or originals will be described next. The operation until an original reaches the registration rollers 605 is the same as that described with reference to FIGS. 7A to 7C. In the read-while-feed operation of the originals containing a large-size original or originals, the original is further guided onto the platen 201 by the inverting feed flapper 613, as shown in FIG. 10A. The original is conveyed over a point B in FIG. 10A at a predetermined speed. The image of the original is read by the scanner 202 which is standing by under the point B. At this time, at the timing when the leading edge of the original passes through the point B, a reading start signal is sent to the reader section 1.

Figure 10B:
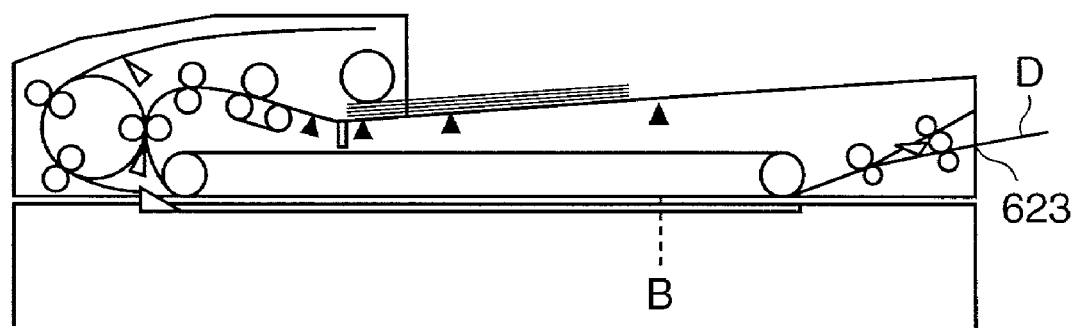

The read original is conveyed to the right of the FIG. 10A and discharged from the automatic document feeder 6 through the original discharge port 623 (FIG. 10B). The point B is formed from six sub-points B0, B1, B2, B3, B4, and B5. A position at which the trailing edge of a 11×17 original passes through the registration rollers 605 is defined as B0, and B1, B2, . . . are defined in 0.5-mm increments from the point B0 to the right. A readable position determined by dust determination (to be described later) is stored, and in the reading mode, the scanner 202 and automatic document feeder 6 are instructed to execute reading at the stored position.

In the stationary reading operation in which an image is read by moving the scanner 202, an original is placed at a position (position shown in FIG. 8D) at which the trailing edge of the original matches the end portion of the platen 201.

Figure 11:
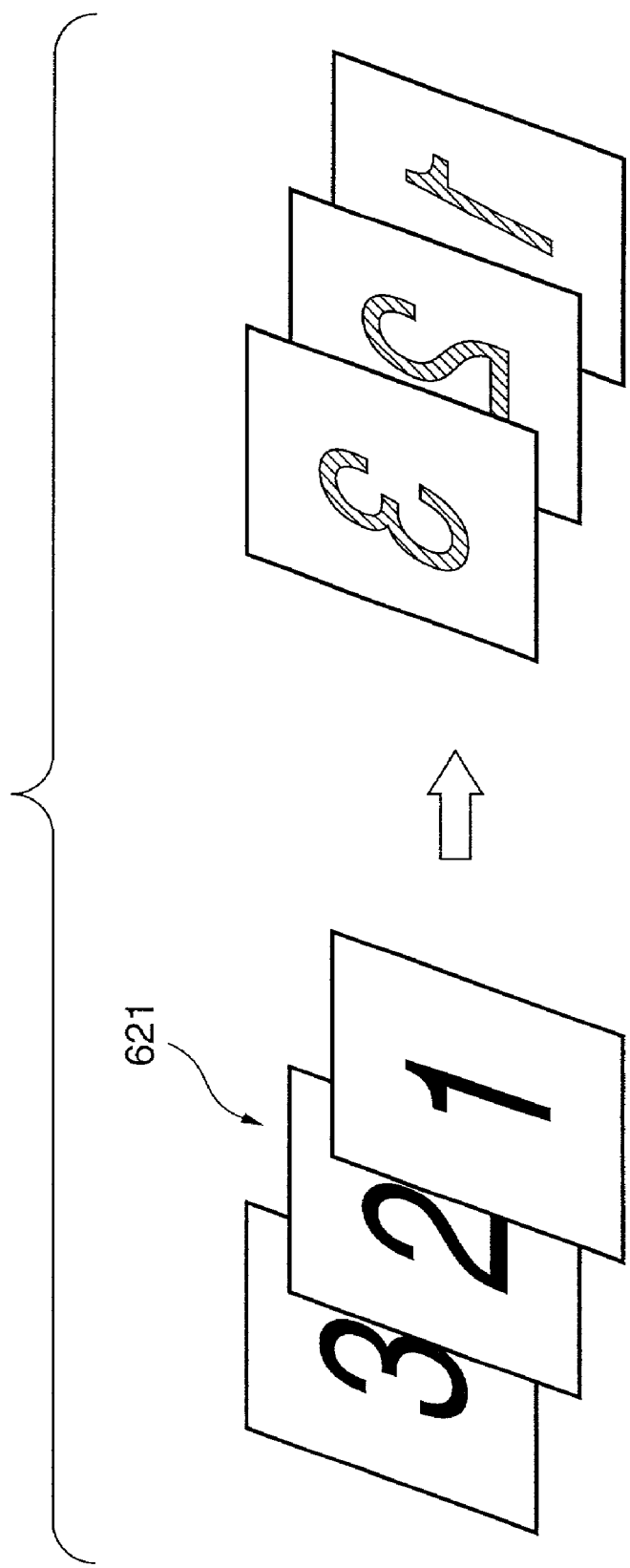
FIG. 11 is a view showing the direction of originals discharged from an original discharge port according to the embodiment of the present invention.

FIG. 11 is a view showing the direction of originals discharged from the original discharge port. FIG. 11 shows the correlation between the direction of the originals 621 set on the original tray 620 of the automatic document feeder 6 (FIG. 7A) and the direction of the originals 621 conveyed and discharged to the original discharge port 623. The originals shown on the left side of FIG. 11 is the originals 621 set on the original tray 620. The originals are sequentially conveyed from the uppermost original 1, inverted, and output. For this reason, the discharged originals are faced down and the lowermost original on the original tray 620 is on the top of the originals, as shown on the right side of FIG. 11.

A control example when an automatic magnification function of calculating an optimum magnification factor on the basis of the original size and output paper size is set in the image reading apparatus having the above arrangement will be described.

When the automatic magnification function is set, and the originals placed on the automatic document feeder are of a single size, the first original of the bundle is fed onto the platen. The original size is detected during feeding, and the original image is read by a stationary reading operation. From the second original, the original images are read by a read-while feed operation while conveyance of originals by the automatic document feeder. However, if a read-while feed operation is impossible at that magnification factor, the original image is read by the stationary reading operation.

When the originals placed on the automatic document feeder contains an original or originals having different sizes (mixed original loading mode), the magnification factor must be calculated for each original. Hence, original images are read by the stationary reading operation until the last original.

Next, dust detection processing according to the first embodiment of the present invention will be described next. In the first embodiment, processing for the original reading scheme (read-while-feed operation) in which the reading position of the scanner 202 is fixed, and an image is read while moving an original will be described.

Figure 12:
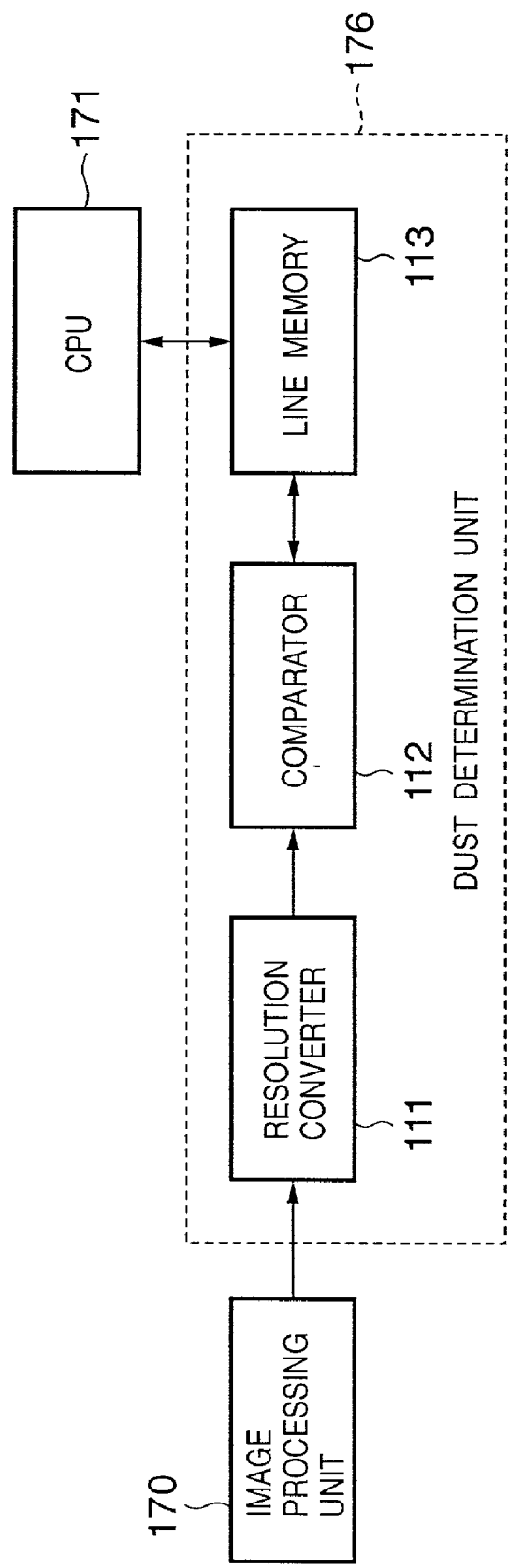
FIG. 12 is a block diagram showing the arrangement of a dust determination unit according to a first embodiment of the present invention.

FIG. 12 is a block diagram showing the arrangement of the dust determination unit 176 according to the first embodiment of the present invention. A plurality of originals to be read by the reader section 1 are sequentially conveyed one by one by the white feed belt 607 of the automatic document feeder 6. An original image is read by the CCD sensor 208 (FIG. 4) of the image processing unit 170 at a main-scanning resolution of, e.g., 600 DPI and a sub-scanning resolution of, e.g., 600 DPI. For the descriptive convenience, the resolution is set at 600 DPI in the first embodiment. However, the resolution is not limited to 600 DPI. The output signal from the CCD sensor 208 is converted into a digital signal by the A/D converter 501 and subjected to shading correction. The digital data after shading correction is 8-bit luminance data from 0 to 255.

Subsequent processing varies depending on whether the output signal from the CCD sensor 208 is a signal for dust detection or a signal for image formation (image data). If the signal is image data, it is input to the log converter 502 (FIG. 4), undergoes various processes at the subsequent stages, and printed by the printer section 2. The image processing unit 170 executes image enlargement/reduction processing, spatial filtering, luminance-density conversion, multilevel-binary conversion, smoothing, and the like, as needed.

Figure 13:
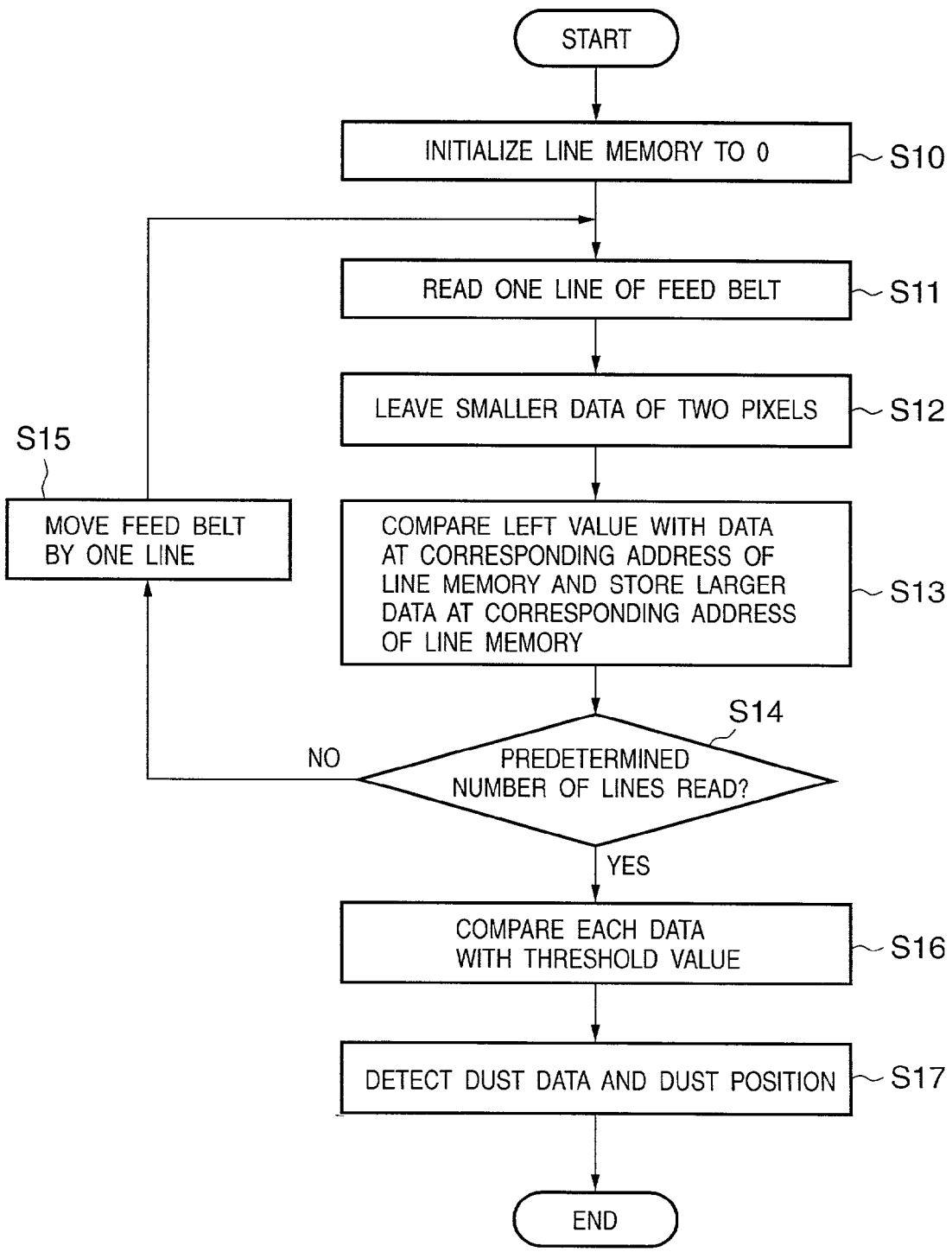
FIG. 13 is a flow chart showing dust determination processing according to the first embodiment of the present invention.

On the other hand, data for dust detection is subjected to processing shown in FIG. 13. Dust detection data to be subjected to the following processing means data read between a given original and the next original by the CCD sensor 208 (i.e., data obtained by reading the feed belt 607).

First, in step S10, an initial value "0" (black) is set in the line memory 113 by the CPU 171 in advance. In step S11, one line of the feed belt 607 is read, and data representing dust or dirt is emphasized using a one-dimensional edge emphasis filter and input to the dust determination unit 176. In the dust determination unit 176, a resolution converter 111 selects data having a smaller value (black) from two adjacent pixels, thereby converting the resolution from 600 DPI to 300 DPI (step S12). The line memory 113 has a capacity for one line at 300 DPI and stores 8-bit data for one pixel. In step S13, data is read out from the line memory 113 in correspondence with each pixel position of data after resolution conversion and compared with image data after resolution conversion by the comparator 112. Larger data (data close to white) is selected and stored in the line memory 113 again.

With the above procedure, data of a predetermined number of lines between the originals (data of the feed belt 607) are read in accordance with a designation from the CPU 171 until YES in step S14. In this case, since the position of the scanner 202, i.e., the reading position by the CCD sensor 208 is fixed, the feed belt 607 is moved by one line (step S15).

After the above processing is executed for a plurality of lines (YES in step S14), of data stored in the line memory 113 in correspondence with the pixels, each data based on the feed belt 607 is replaced with white data (255) representing that no dust or dirt is present or data close to white. In contrast, dust or dirt on the platen glass 201 does not move from a predetermined position and is continuously reflected on the data. For this reason, data stored in the line memory 113 at the address of a pixel position corresponding to dust or dirt on the platen glass 201 is data representing dust or dirt (to be referred to as "dust data"). When dust data equal to or smaller than a predetermined threshold value is extracted (step S16), the position of the dust data can be recognized (step S17).

Figure 14A:
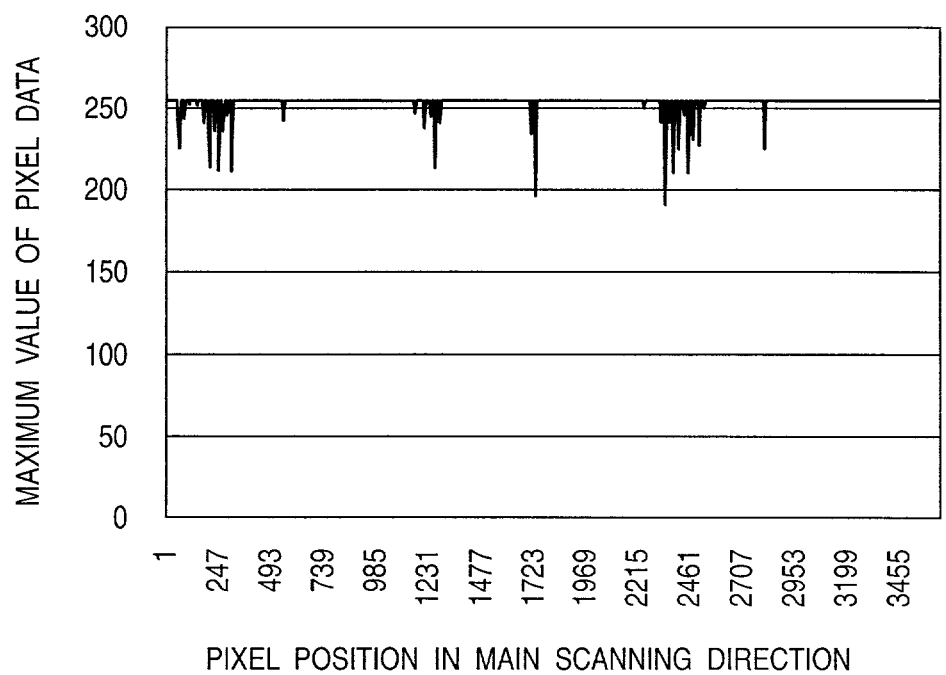
FIGS. 14A and 14B are graphs showing data in a line memory, which are obtained when a feed belt portion corresponding to 128 lines is read and a feed belt portion corresponding to 256 lines is read without any dust or dirt on the platen in the first embodiment of the present invention.
Figure 14B:
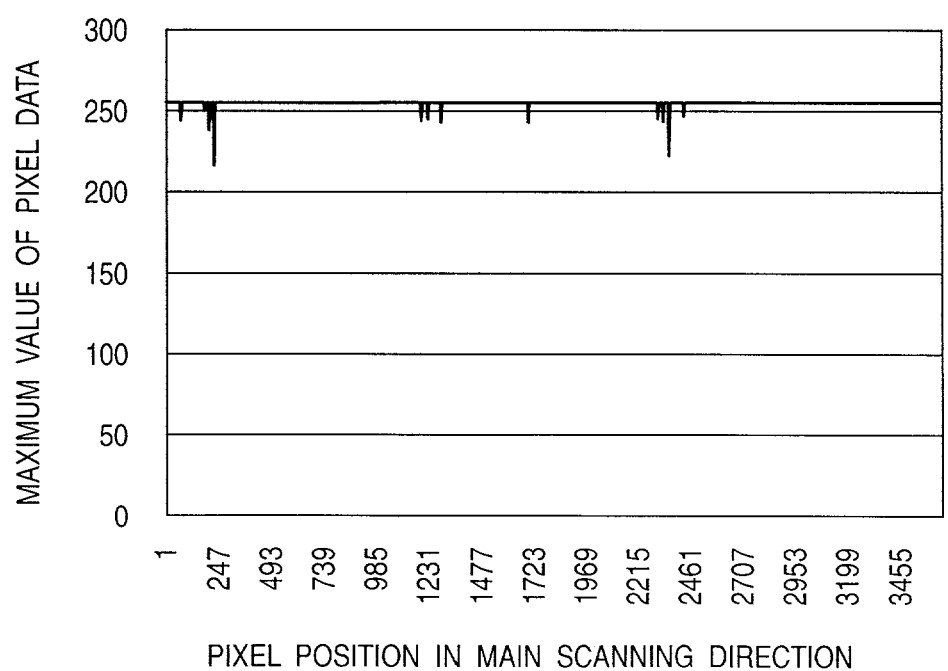

FIG. 14A shows data in the line memory 113, which is obtained when the above-described operation is executed for 128 lines in a state wherein no dust is present on the platen glass, and the feed belt 607 is very dirty (after 60,000 or more originals are conveyed). FIG. 14B shows data in the line memory 113, which is obtained by executing the operation for 256 lines. In reading 128 lines, a plurality of pixels having a data value of 200 or less are present. In reading 256 lines, no pixel having a data value of 200 or less is present.

Figure 15A:
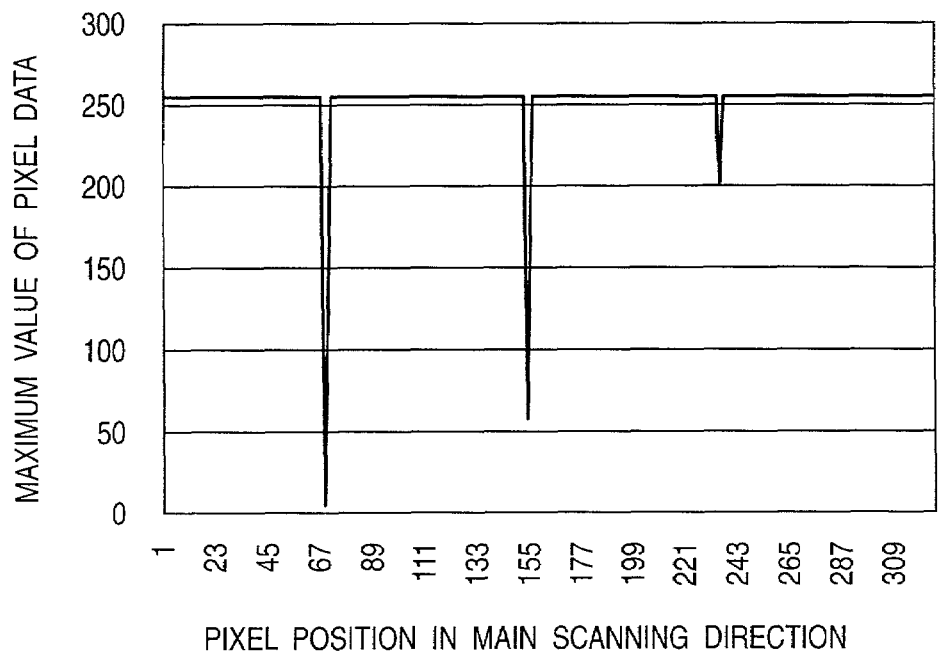
FIGS. 15A and 15B are graphs showing data in the line memory, which are obtained when a feed belt portion corresponding to 128 lines is read and a feed belt portion corresponding to 256 lines is read with dust on the platen in the first embodiment of the present invention.
Figure 15B:
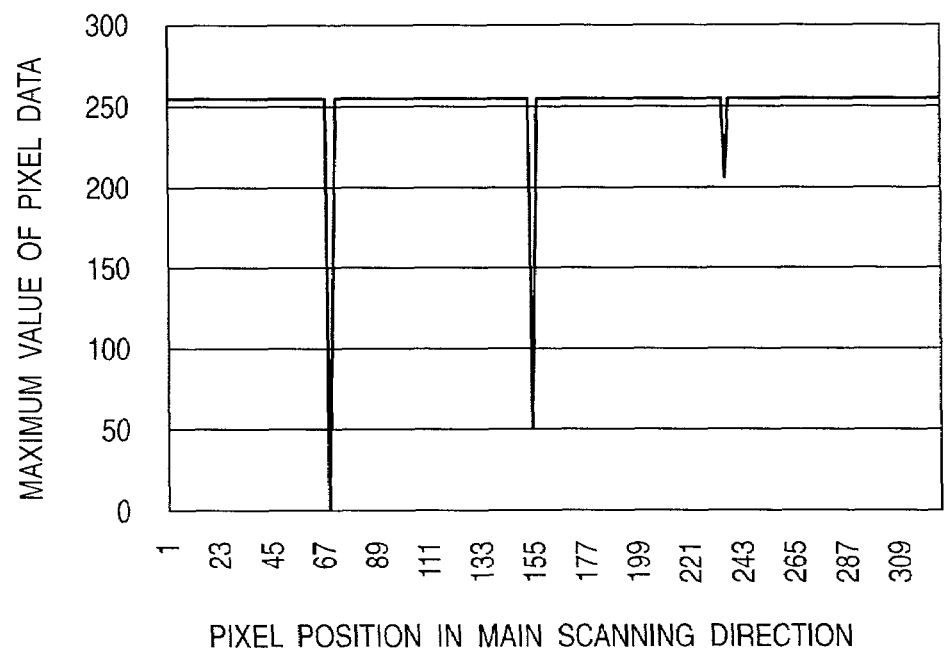

FIG. 15A shows data in the line memory 113, which is obtained when the above-described operation is executed for 128 lines in a state wherein the feed belt 607 has little dirt, and dust particles stick to the platen glass 201. FIG. 15B shows data in the line memory 113, which is obtained by executing the operation for 256 lines. Since the feed belt has little dirt, data of dirt of the belt is not detected. To the contrary, data values of 0, 50, and 200 can be observed at pixels corresponding to dust particles. These values are the same for both 128-line reading and 256-line reading and are not affected by the number of read lines. For this reason, when a threshold value is determined in consideration of the degree of dirt and dust of the feed belt 607 and the number of read lines, the dirt and dust on the feed belt 607 can be accurately discriminated.

If it is determined by the above operation that dust or dirt is present on the platen glass 201, the position of the CCD sensor 208 is moved relative to the platen glass 201 (for example, the point A corresponding to the position of the scanner 202, which has been described with reference to FIGS. 9A and 9B, is moved to another point in the points A0 to A5, or the point B corresponding to the position of the scanner 202, which has been described with reference to FIGS. 10A and 10B, is moved to another point in the points B0 to B5), and dust detection is executed again, thereby reading an original at a position where neither dust nor dirt is present on the platen glass 201.

As described above, according to the present invention, since the average density of a white data region (feed belt) need not be obtained, unlike the prior art, the memory used to add sampling data can be omitted, and the processing time required to obtain the average density can be shortened. In addition, when data for dust detection is converted into a low resolution, the capacity of the line memory can be reduced, and the circuit scale can be reduced.

<Second Embodiment>

The second embodiment of the present invention will be described next. The main arrangement of a digital copying machine serving as an image reading apparatus according to the second embodiment is the same as that described in the above first embodiment with reference to FIGS. 1 to 11, and a description thereof will be omitted.

In the second embodiment, the arrangement and operation of a dust determination unit 176 are different from those of the first embodiment. The arrangement and dust determination operation of the dust determination unit according to the second embodiment will be described below.

Figure 16:
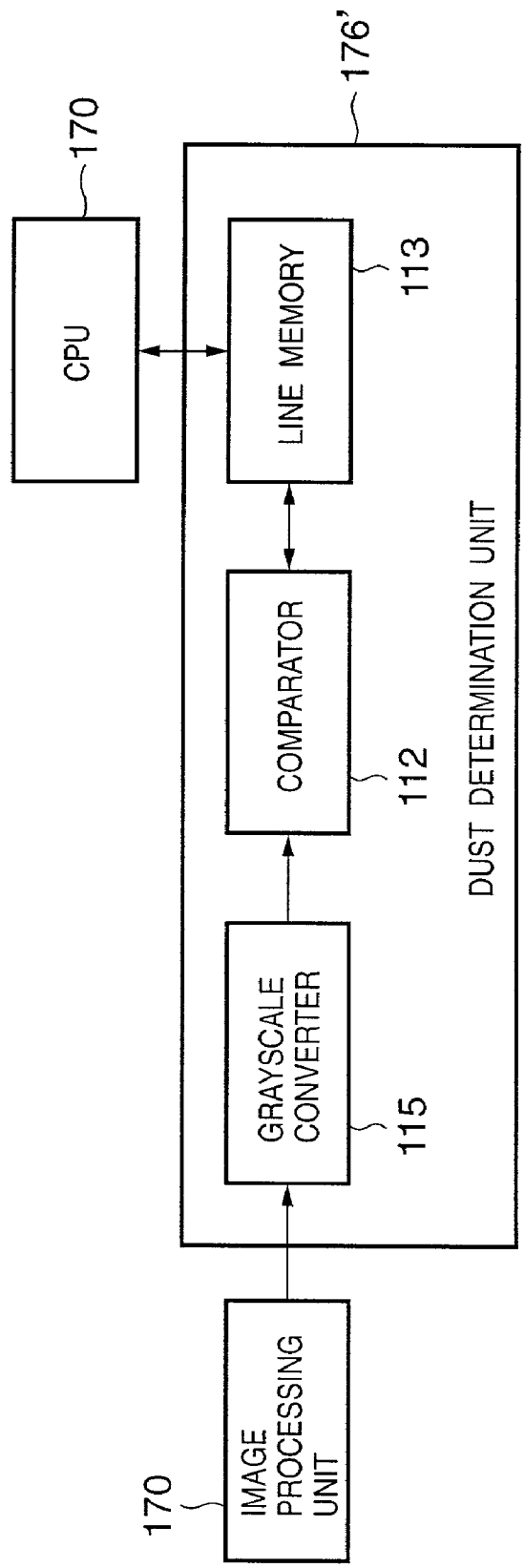
FIG. 16 is a block diagram showing the arrangement of a dust determination unit according to a second embodiment of the present invention.

FIG. 16 is a block diagram showing the arrangement of a dust determination unit 176' according to the second embodiment of the present invention. The same reference numerals as in FIG. 12 denote the same parts in FIG. 16, and a description thereof will be omitted. In the arrangement shown in FIG. 16, a grayscale converter 115 is prepared in place of the resolution converter 111.

Figure 17:
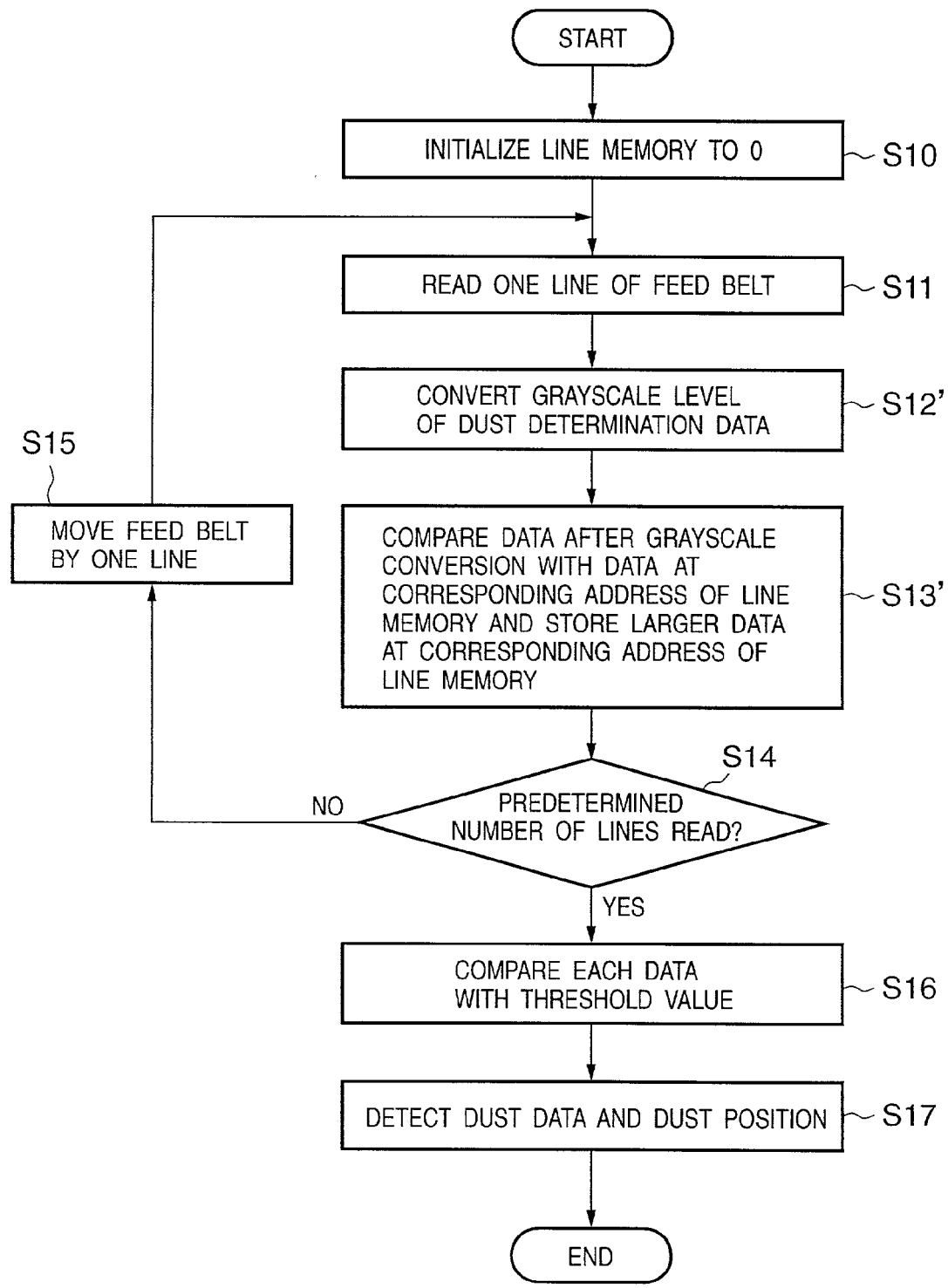
FIG. 17 is a flow chart showing dust determination processing according to the second embodiment of the present invention.

In the second embodiment, processing shown in FIG. 17 is executed for data for dust detection, i.e., data obtained by reading a feed belt 607. The same step numbers as in FIG. 13 denote the like processes in FIG. 17.

First, in step S10, an initial value "0" (black) is set in a line memory 113 by a CPU 171 in advance. In step S11, one line of the feed belt 607 is read, and data representing dust or dirt is emphasized using a one-dimensional edge emphasis filter and input to the dust determination unit 176'. In the dust determination unit 176', the grayscale converter 115 re-quantizes the data into 5-bit 32-grayscale data by bit shift (step S12'). The line memory 113 has a capacity for one line and stores 5-bit data for one pixel. In step S13', data is read out from the line memory 113 in correspondence with each pixel position of data after grayscale conversion and compared with image data after grayscale conversion by a comparator 112. Larger data (data close to white) is selected and stored in the line memory 113 again.

With the above procedure, data of a predetermined number of lines between the originals (data of the feed belt 607) are read in accordance with a designation from the CPU 171 until YES in step S14. As in the first embodiment, since the position of a scanner 202, i.e., the reading position by a CCD sensor 208 is fixed, the feed belt 607 is moved by one line (step S15).

After the above processing is executed for a plurality of lines (YES in step S14), of data stored in the line memory 113 in correspondence with the pixels, each data based on the feed belt 607 is replaced with white data (255) representing that no dust or dirt is present or data close to white. In contrast, dust or dirt on the platen glass 201 does not move from a predetermined position and is continuously reflected on the data. For this reason, data stored in the line memory 113 at the address of a pixel position corresponding to dust or dirt on the platen glass 201 is data representing dust or dirt (to be referred to as "dust data"). When dust data equal to or smaller than a predetermined threshold value is extracted (step S16), the position of the dust data can be recognized (step S17).

Figure 18A:
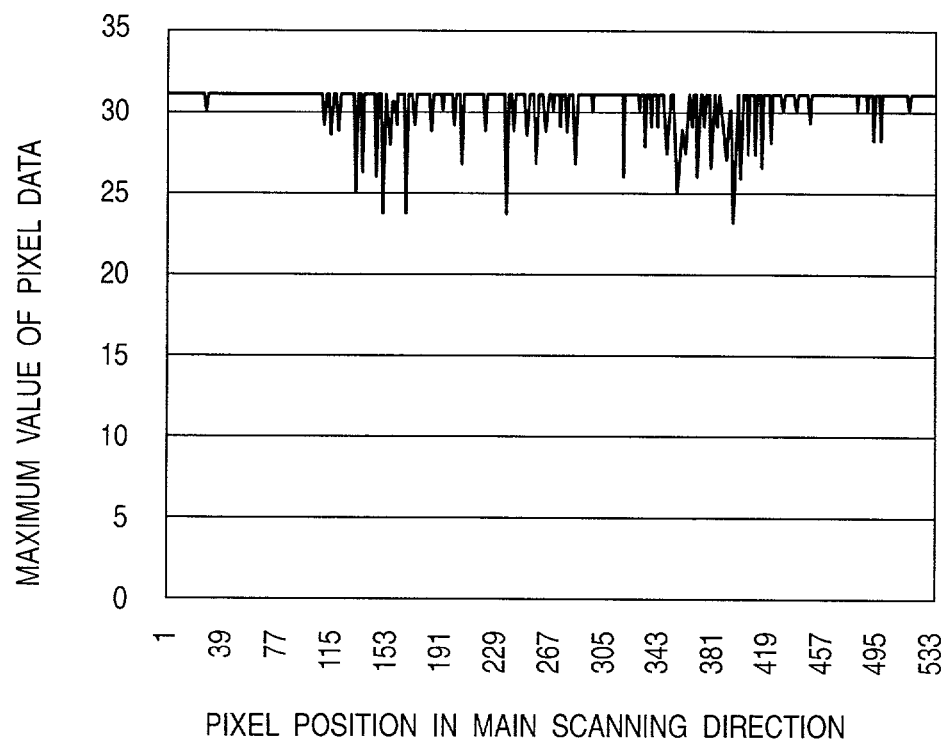
FIGS. 18A and 18B are graphs showing data in a line memory, which are obtained when a feed belt portion corresponding to 128 lines is read and a feed belt portion corresponding to 256 lines is read without any dust or dirt on the platen in the second embodiment of the present invention.
Figure 18B:
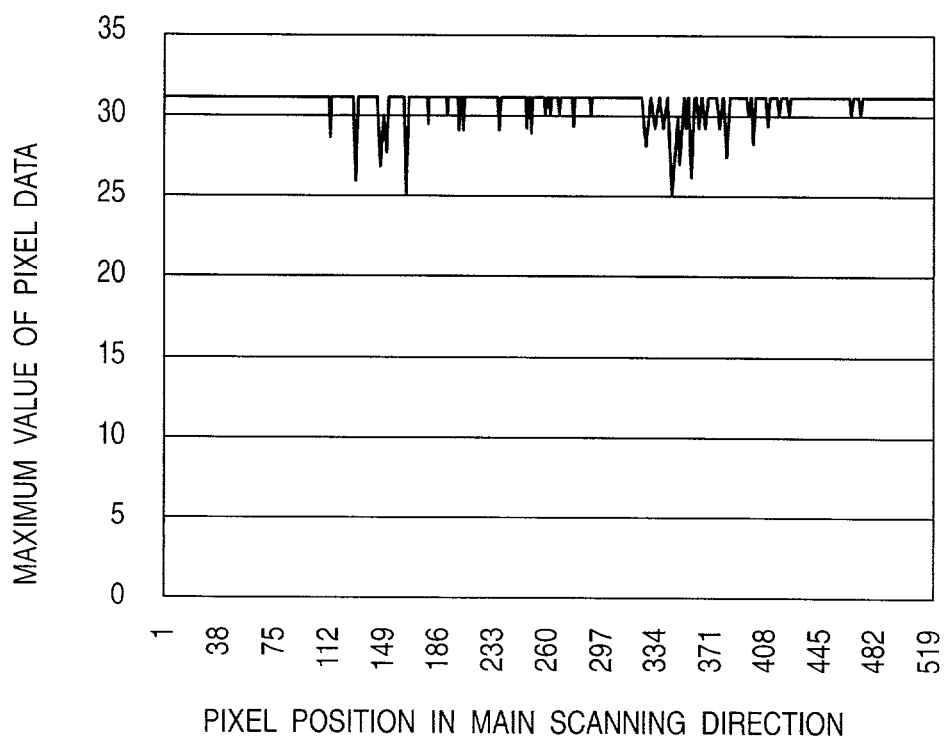

FIG. 18A shows data in the line memory 113, which is obtained when the above-described operation is executed for 128 lines in a state wherein no dust is present on the platen glass, and the feed belt 607 is very dirty (after 60,000 or more originals are conveyed). FIG. 18B shows data in the line memory 113, which is obtained by executing the operation for 256 lines. In reading 128 lines, a plurality of pixels having a data value of 25 or less are present. In reading 256 lines, no pixel having a data value of 25 or less is present.

Figure 19A:
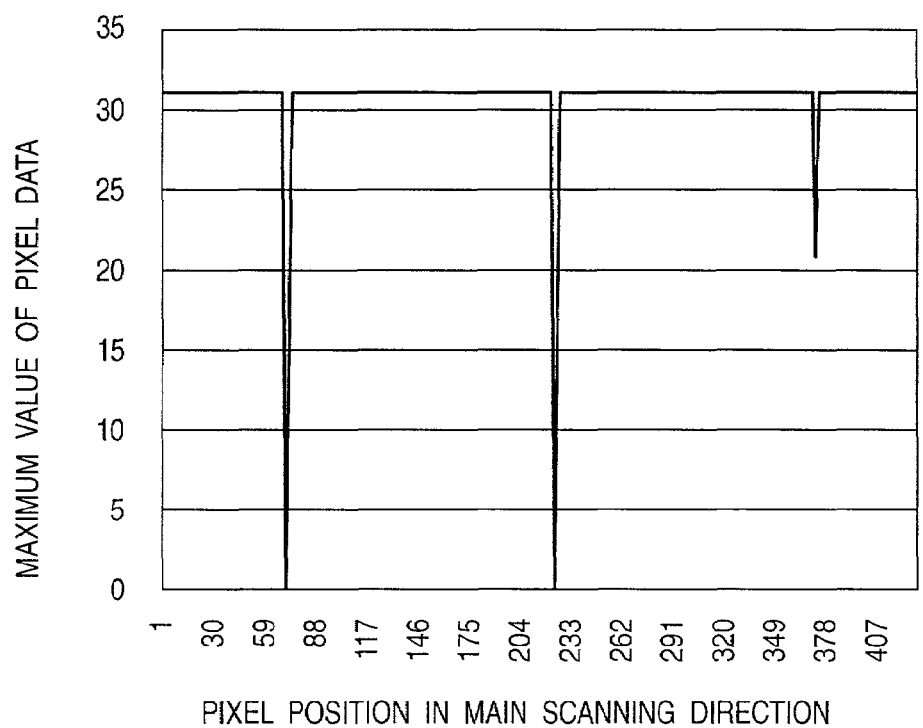
FIGS. 19A and 19B are graphs showing data in the line memory, which are obtained when a feed belt portion corresponding to 128 lines is read and a feed belt portion corresponding to 256 lines is read with dust on the platen in the second embodiment of the present invention.
Figure 19B:
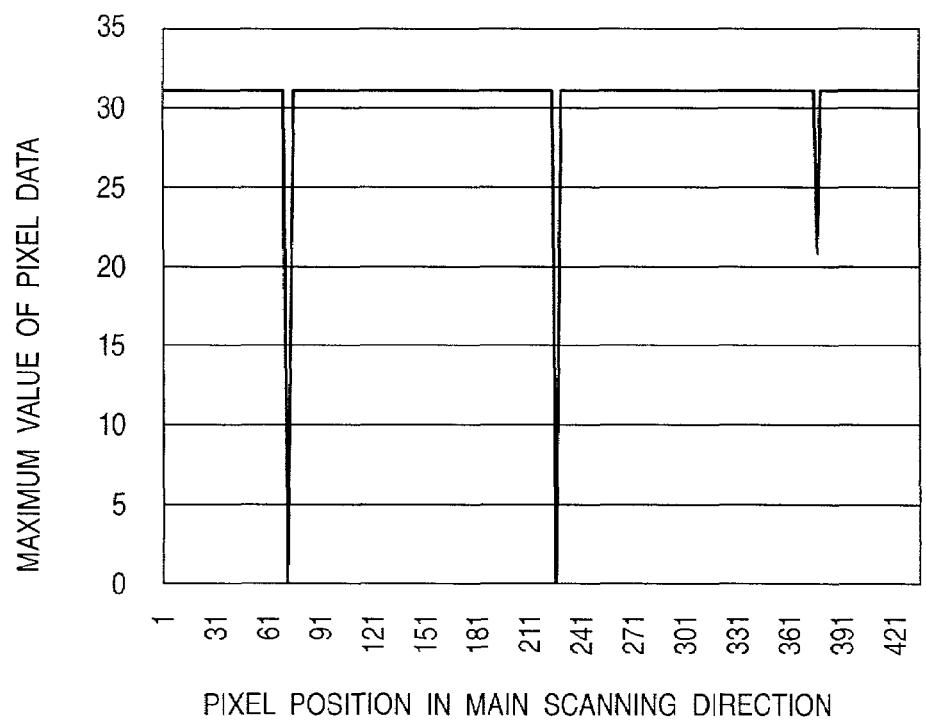

FIG. 19A shows data in the line memory 113, which is obtained when the above-described operation is executed for 128 lines in a state wherein the feed belt 607 has little dirt, and dust particles stick to the platen glass 201. FIG. 19B shows data in the line memory 113, which is obtained by executing the operation for 256 lines. Since the feed belt has little dirt, data of dirt of the belt is not detected. To the contrary, data values of about 0 and 20 can be observed at pixels corresponding to dust particles. These values are the same for both 128-line reading and 256-line reading and are not affected by the number of read lines. For this reason, when a threshold value is determined in consideration of the degree of dirt and dust of the feed belt 607 and the number of read lines, the dirt and dust on the feed belt 607 can be accurately discriminated.

If it is determined by the above operation that dust or dirt is present on the platen glass 201, as in the first embodiment, the position of the CCD sensor 208 is moved relative to the platen glass 201, and dust detection is executed again, thereby reading an original at a position where no dust or dirt is present.

According to the second embodiment, the same effect as in the first embodiment can be obtained.

<Modification>

Figure 20:
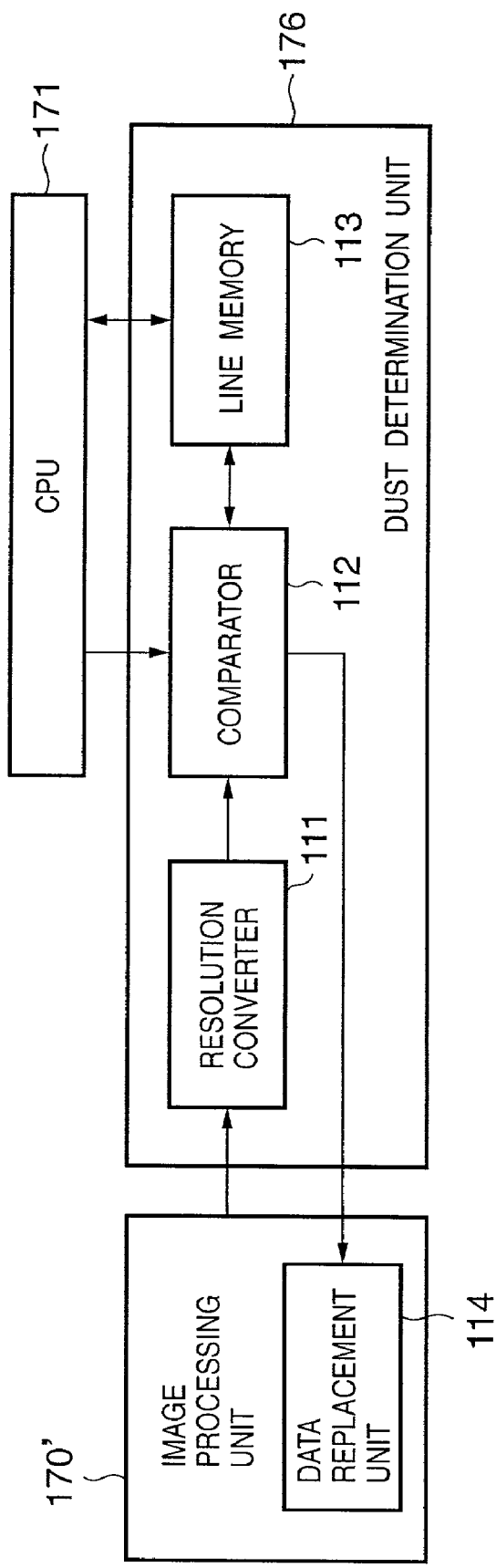
FIG. 20 is a block diagram showing the arrangement of a dust determination unit and image processing unit according to a modification of the present invention.
Figure 21:
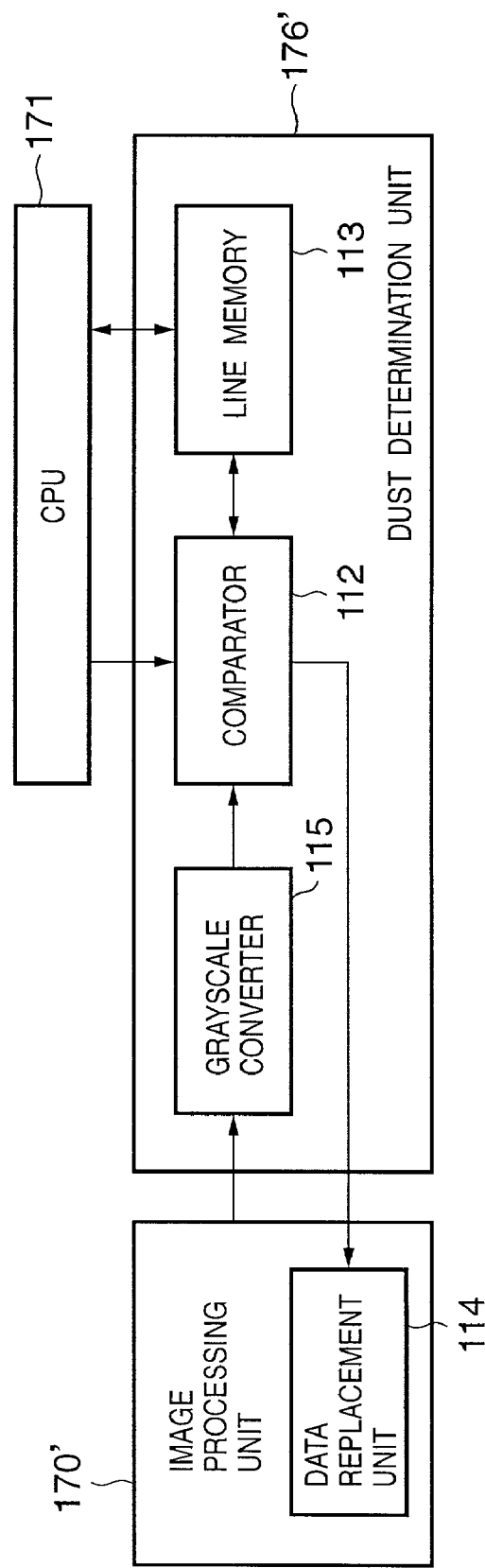
FIG. 21 is a block diagram showing the arrangement of a dust determination unit and image processing unit according to the modification of the present invention.
Figure 22:
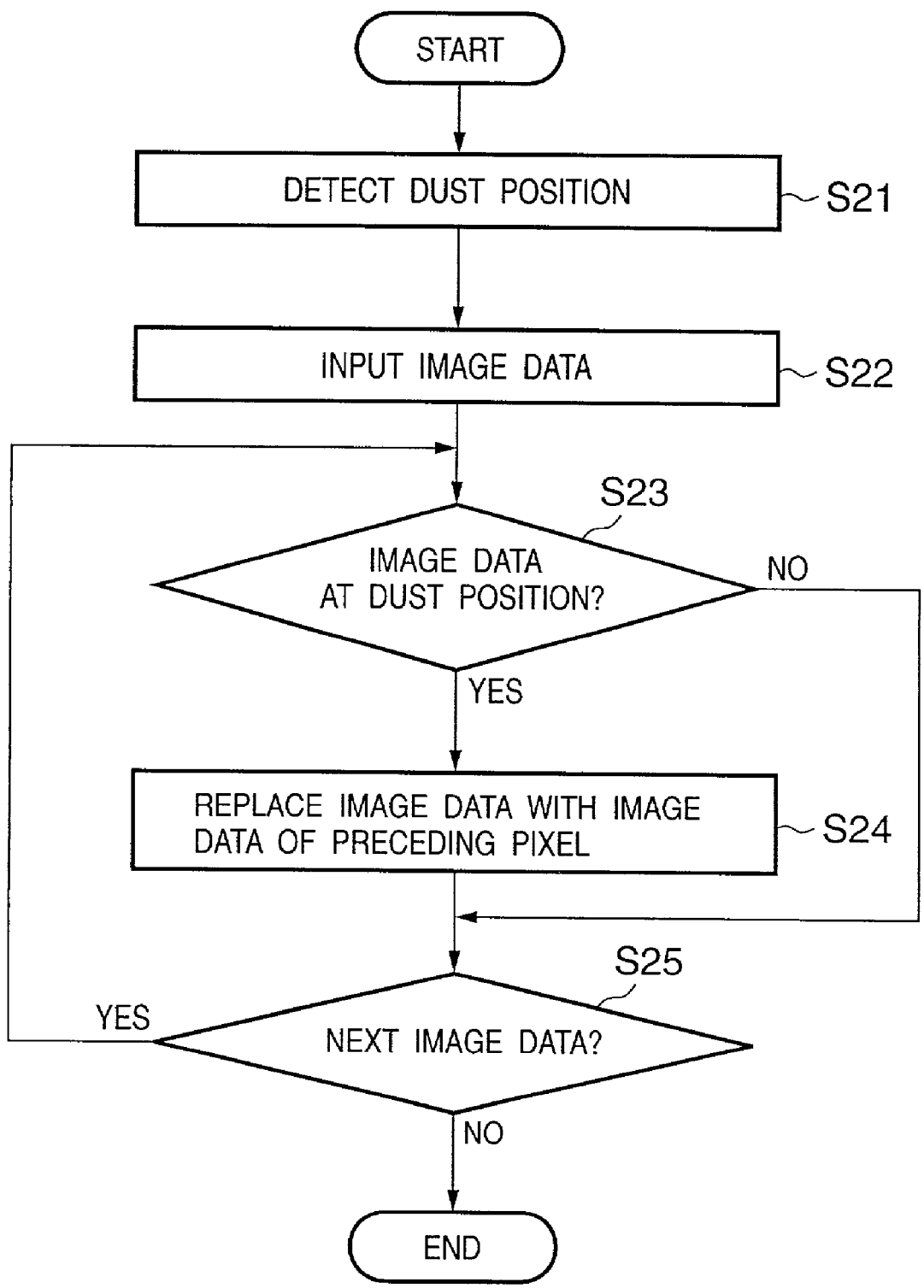
FIG. 22 is a flow chart showing a procedure of image data processing according to the modification of the present invention.

In the first and second embodiments, when dust or dirt on the platen glass 201 is detected, the position of the CCD sensor 208 is moved to prevent the dust or dirt from being read. However, a dust component may be erased from image data. FIGS. 20 and 21 are block diagrams showing the arrangements of a dust determination unit 176 or 176' and an image processing unit 170' when a dust component is to be erased from image data. FIG. 22 is a flow chart showing a procedure of image processing in the modification. The image processing unit 170' has a data replacement unit 114 in addition to the arrangement shown in FIG. 4.

First, a dust detection result is prepared in the line memory 113 in accordance with the same procedure as in the first or second embodiment described with reference to FIG. 13 or 17. Next, a threshold value used to determine dust or dirt is set in the comparator 112 by the CPU 171. This set value is determined on the basis of the state of the feed belt 607 and the number of reference lines. The comparator 112 compares each data stored in the line memory 113 with the threshold value to detect dust data and dust position (step S21) and transfers the detected dust position to the data replacement unit 114.

For the image data obtained by reading the effective data region of an original image by the CCD sensor 208 (step S22), the data replacement unit 114 determines for each pixel whether the image data corresponds to the dust position (step S23).

If YES in step S23, the image data is replaced with image data input at the immediately preceding pixel in step S24. This operation is executed for all image data, thereby erasing the dust component.

If no dust or dirt can be detected by the comparator 112, the entire processing by the data replacement unit 114 may be omitted.

In the above example, image data corresponding to a dust position is replaced with image data input at the immediately preceding pixel. However, the present invention is not limited to this. The image data may be replaced using a known interpolation method on the basis of image data of an adjacent pixel.

<Third Embodiment>

The third embodiment of the present invention will be described next. The arrangement of a digital copying machine serving as an image reading apparatus according to the third embodiment is the same as that described in the above first embodiment with reference to FIGS. 1 to 11, and a description thereof will be omitted.

In the third embodiment, the arrangement and operation of a dust determination unit 176 are different from those of the first and second embodiments. The arrangement and dust determination operation of the dust determination unit 176 according to the third embodiment will be described below.

Figure 23:
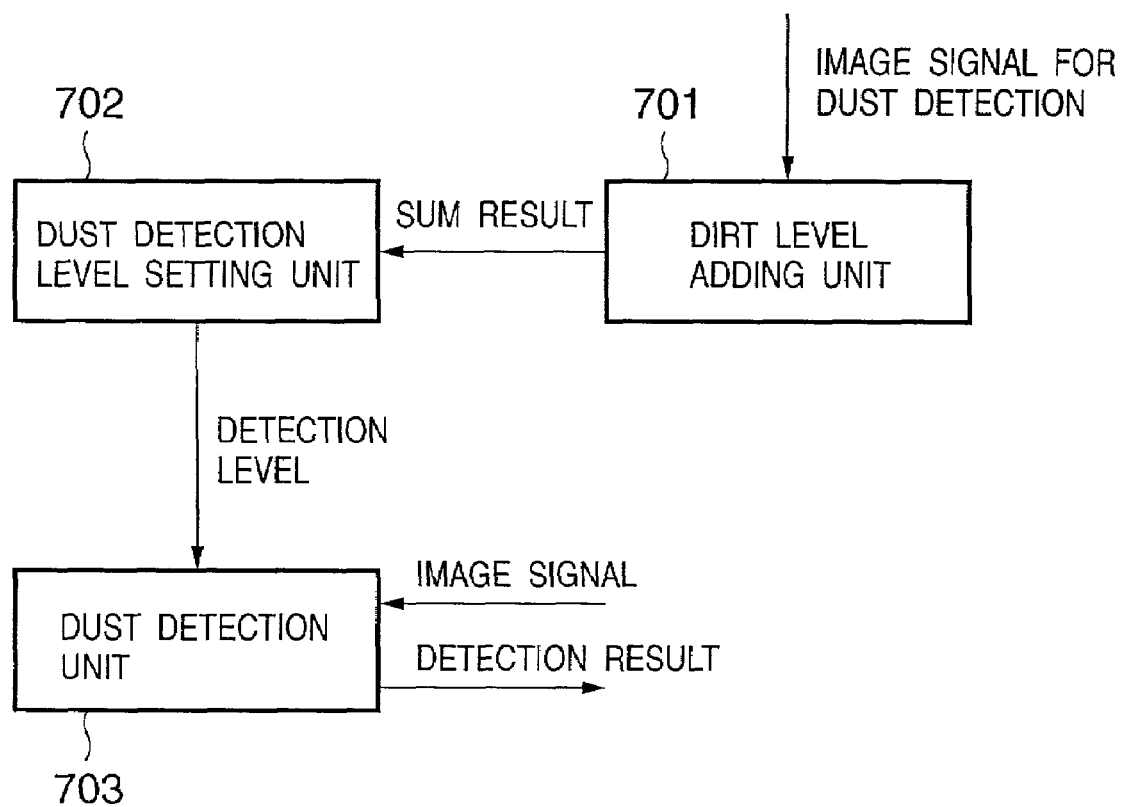
FIG. 23 is a block diagram showing the arrangement of a dust determination unit according to a third embodiment of the present invention.

The dust determination unit 176 according to the third embodiment comprises a dirt level adding unit 701, dust detection level setting unit 702, and dust detection unit 703, as shown in FIG. 23. The dirt level adding unit 701 reads an image on the surface of an original convey section for sequentially conveying a plurality of originals onto the platen. The dust detection level setting unit 702 sets a dust detection level on the basis of the sum result from the dirt level adding unit 701. The dust detection unit 703 compares an image signal obtained from a CCD sensor 208 with the set dust detection level to determine whether the image data of a dust component is contained in the read image data.

An image of a feed belt 607 formed on the CCD sensor 208 through a lens 207 is read and digitized, like an image obtained by reading an original, and subjected to shading correction. Data for dust detection is sent to the dust determination unit 176. In the dust determination unit 176, input data for dust detection is added with the previously obtained data for each pixel. If the sum result is less than a predetermined level, it is determined that a dust particle sticks to the pixel portion.

Figure 24:
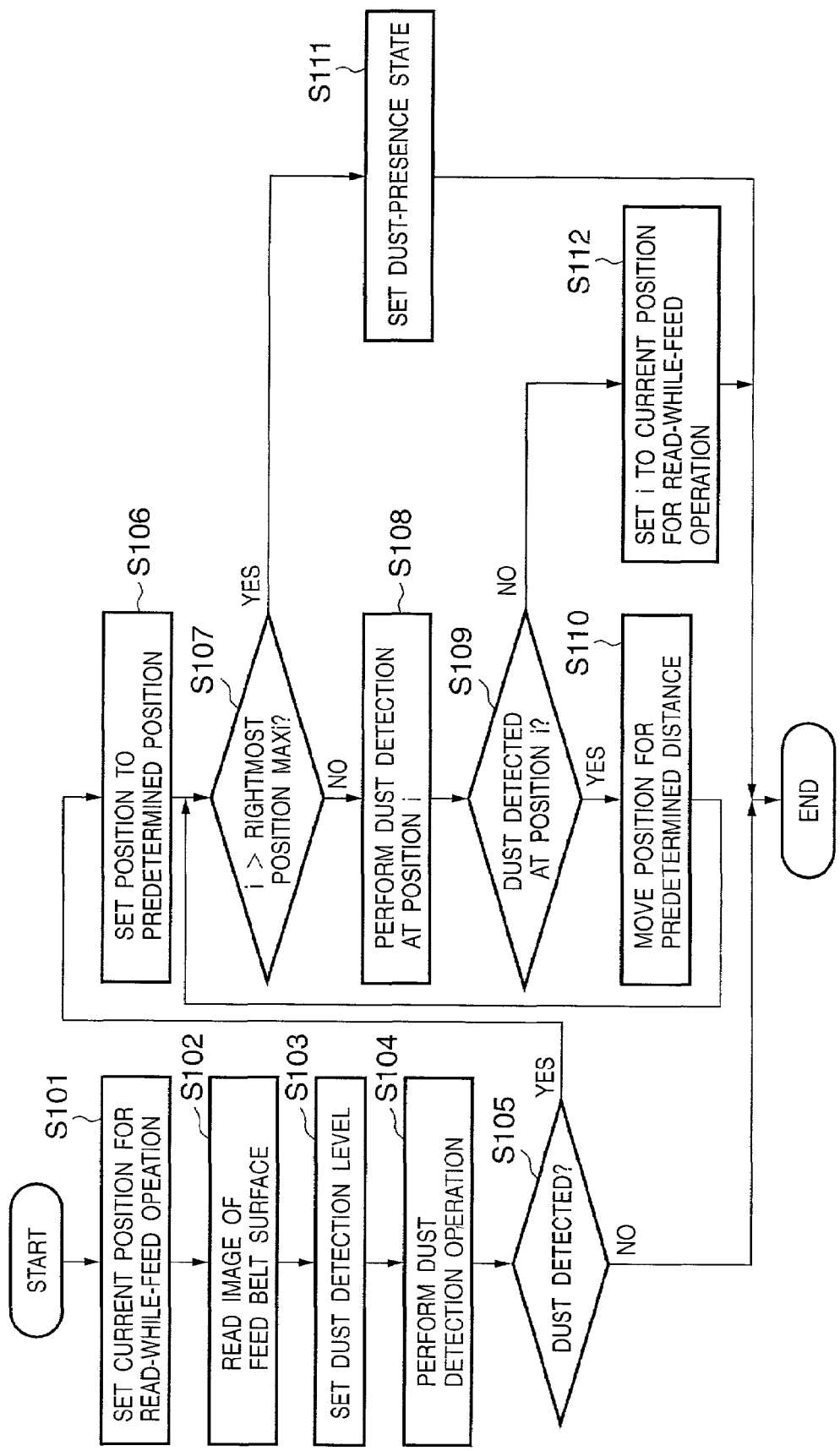
FIG. 24 is a flow chart for explaining dust detection processing according to the third embodiment of the present invention.

FIG. 24 is a flow chart showing the basic operation related to the dust detection operation.

First, the current position at which a read-while-feed operation is performed (i.e., the fixed reading position of a scanner 202) is set (step S101). In dust detection in the read-while-feed operation, an image is read while moving a feed belt 607 of an automatic document feeder 6 without feeding any original whereby dust and/or dirt on a platen glass 201 is detected. When the surface of the feed belt 607 of the automatic document feeder 6 is dirty, dirt on the platen glass 201 cannot be properly detected. For this reason, the dirt level of the feed belt 607 of the automatic document feeder 6 is detected before dust detection (step S102).

Dirt level detection for the feed belt 607 is done by reading an image from the CCD sensor 208 without feeding any original and adding image data of the surface of the feed belt 607 in an image memory (not shown) in the dirt level adding unit 701. The contents of the image memory are searched to detect a region that is supposed to be dirt on the belt because the image reading level is low. The reading level of the region is stored.

Using the dirt level of the surface of the feed belt 607 of the automatic document feeder 6 as a reference, the dust detection level is set (step S103). In the third embodiment, the dust detection level setting unit 702 sets in the dust detection unit 703 as a dust detection level a value obtained by subtracting a predetermined value from the sum value of reading levels obtained by reading the image of the surface of the feed belt 607.

Under this control, if the surface of the feed belt 607 is dirty, the dust detection level is set to be low to make it hard to detect dust. With this processing, detection error that dirt on the surface of the feed belt 607 is detected as dust or dirt on the surface of the platen glass 201 can be prevented. If the surface of the feed belt 607 is clean without any dirt, the dust detection level is set to be high to make it easy to detect dust. With this processing, dust or dirt on the surface of the platen glass 201 can be accurately detected.

When the dirt level exceeds a predetermined level, i.e., when, in detecting the dirt level, dust or dirt already sticks to the platen glass 201, the dirt level of the surface of the feed belt 607 cannot be properly detected. For this reason, if the dirt level obtained by reading the image of the surface of the feed belt 607 exceeds a predetermined level, a general design value is set as the dust detection level instead of setting the dust detection level on the basis of the dirt level.

When the read-while-feed operation of reading an image of an original being conveyed by the document feeder 6 is to be executed, a time when no image reading operation is executed is used. Without changing the current position for the read-while-feed operation, the feed belt 607 is moved without feeding any original, and the image is read. As the read image signal, the image of the surface of the feed belt 607 of the document feeder is input. However, when dust sticks to the platen glass 201, an image continuous in the sub-scanning direction is detected in the read image signal.

If such an image probably based on dust or dirt on the platen glass 201 is detected after the feed belt 607 is driven for a predetermined time to read the image (YES in step S105), it is determined that the read-while-feed operation cannot be continued at the same reading position. If no abnormal image is detected (NO in step S105), it is determined that the read-while-feed operation is to be continued at that position, and the processing is ended. The presence/ absence of dust is determined by comparison with the dust detection level set in the dust detection unit 703 (step S104). If an image darker than the dust detection level is detected, it is determined that dust sticks to the platen glass 201. If an image brighter than the dust detection level is detected, it is determined that dirt of the belt is read, and no dust or dirt sticks to the platen glass.

When dust or dirt of the platen glass 201 is detected at the current position for the read-while-feed operation (YES in step S105), the position is moved to a predetermined position to detect a position where the read-while-feed operation is possible. The scanner 202 is moved from that position in a predetermined direction by a predetermined distance, thereby sequentially searching for a position where the read-while-feed operation is possible. For example, when the position for the read-while-feed operation is the point A described with reference to FIGS. 9A to 9C, the scanner 202 is moved leftward to the point A0. After that, the scanner 202 is moved from the point A0 to A1, A2, . . . to search for a position where flow scanning is possible.

First, the scanning position is moved to a predetermined position (step S106), and that position is defined as the next candidate position (i) where the read-while-feed operation can be performed. It is determined in step S107 whether the current position for the read-while-feed operation falls outside a predetermined range. For example, when the flow scanning position is the point A described with reference to FIGS. 9A to 9C, it is determined whether the flow scanning position falls outside the range of the points A0 to A5. A rightmost position MAXi in step S107 is A5. If YES in step S107, the flow advances to step S111. If NO in step S107, since the flow scanning position falls within the predetermined range, the flow advances to step S108.

In step S108, to detect whether the read-while-feed operation can be executed at that position (whether dust is present), the above-described image reading operation for dust detection (move feed belt without feeding any original, read image, and analyze image) is performed. If it is determined that no dust or dirt is present (NO in step S109), it is determined that the read-while-feed operation is possible at that position (step S112), and the next read-while-feed operation is executed at that position. If dust or dirt is detected by the detection operation (YES in step S109), the position is moved by a predetermined distance in the sub-scanning direction (step S110), and processes in steps S107 to S109 are repeated. This processes are repeated until a position where the read-while-feed operation can be executed is found or the moved position falls outside of the predetermined range.

When dust or dirt is detected at all of the predetermined number of reading positions by dust detection (YES in step S107), it is determined that image reading by the read-while-feed operation cannot be executed, and the copying machine is set in a dust-presence state (step S111). Until it is determined by predetermined processing (to be described later) that the read-while-feed operation is possible, the reading operation by the read-while-feed operation is not performed.

A control example when it is determined whether flow scanning is to be executed on the basis of the result of dust detection operation using a read-while-feed inhibition flag, and the user is notified of the presence of dust or dirt in the image reading apparatus having the above arrangement will be described.

Figure 25:
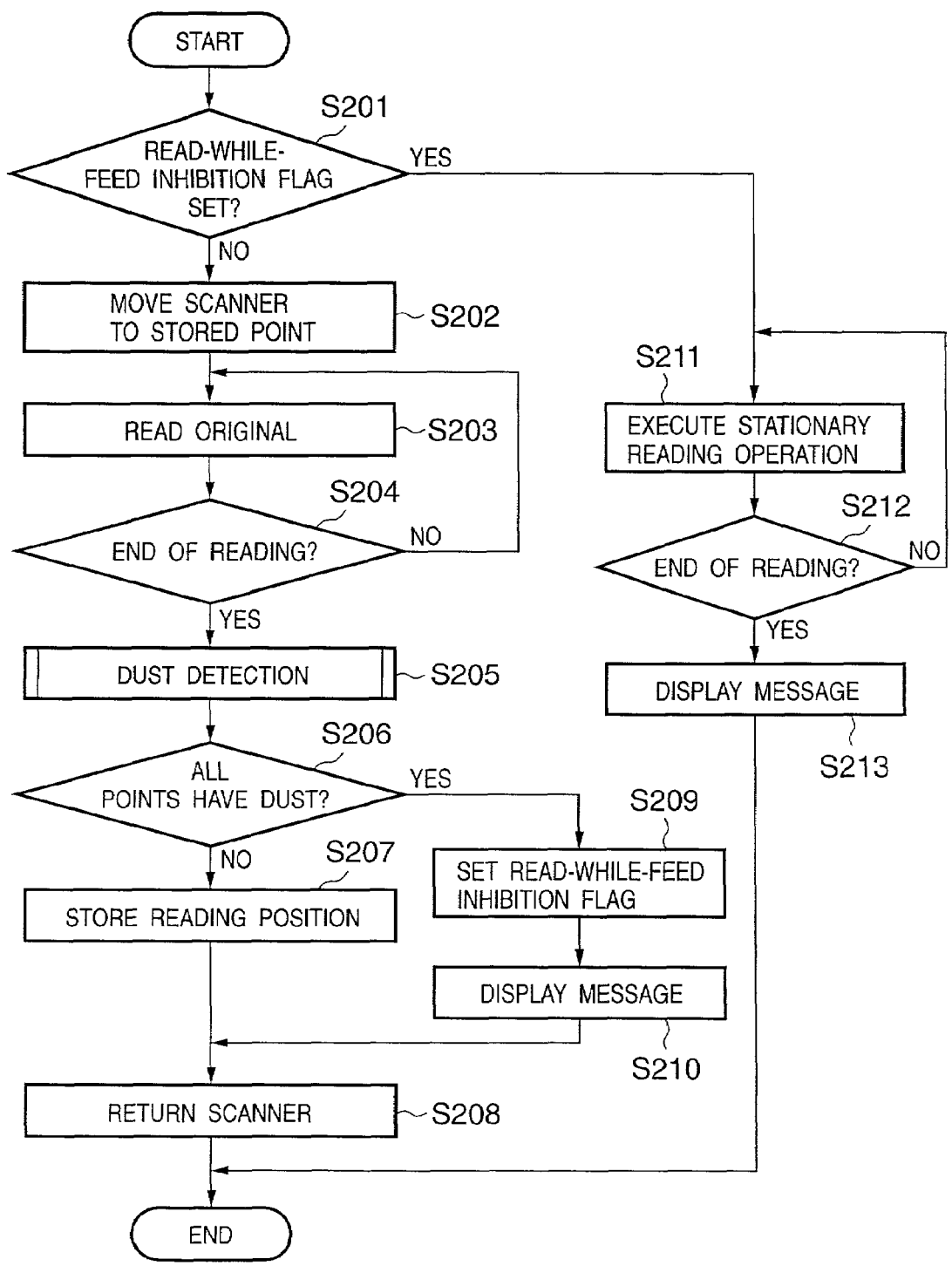
FIG. 25 is a flow chart for explaining a control method for an image reading apparatus according to the third embodiment of the present invention.

FIG. 25 is a flow chart showing the control method. This control starts when no dust-presence message is displayed, originals are set, and a mode in which reading is executed by the read-while-feed operation is set.

First, in step S201, it is determined whether the read-while-feed inhibition flag is set. If NO in step S201, the read-while-feed operation can be executed. Hence, the flow advances to step S202 to move the scanner to a point that is stored as a reading position. Thereafter, the flow advances to step S203 to feed the uppermost original, and reading processing by the read-while-feed operation is executed. The flow advances to step S204 to determine whether the fed original is the last original, and the reading processing is ended. If NO in step S204, the flow returns to step S203 to continue the reading processing.

If YES in step S204, the flow advances to step S205 to execute the dust detection operation shown in FIG. 24. The flow advances to step S206 to determine whether all points have dust or dirt as a result of dust detection in step S205. If any one of the points has no dust or dirt, the flow advances to step S207 to store the point without any dust or dirt as the position to be subsequently used in the read-while-feed operation. Then, the flow advances to step S208 to move the scanner 202 to a predetermined standby position, and the processing is ended.

If it is determined in step S206 that all the positions have dust, the flow advances to step S209 to set the read-while-feed inhibition flag. Then, the flow advances to step S210 to notify a message as shown in FIG. 27 by display or sound to prompt the user to clean the dust and/or dirt, and the flow advances to step S208.

If YES in step S201, it means that the message is cleared without cleaning the dust and/or dirt. Hence, the original cannot be properly read in the read-while-feed operation. Hence, the reading method is switched to stationary reading operation capable of reading the original with less influence of dust and/or dirt. The flow advances to step S211 to execute reading processing in the stationary reading operation. Then, the flow advances to step S212 to determine whether the fed original is the last original and the reading processing is ended.

If NO in step S212, the flow returns to step S211 to continue the reading processing. If YES in step S212, the flow advances to step S213 to notify the message as shown in FIG. 27 by display and/or sound to prompt the user to clean the dust. After that, the processing is ended. A control example when a message is to be displayed when the read-while-feed inhibition flag is set after the end of the reading operation has been described above.

Figure 26:
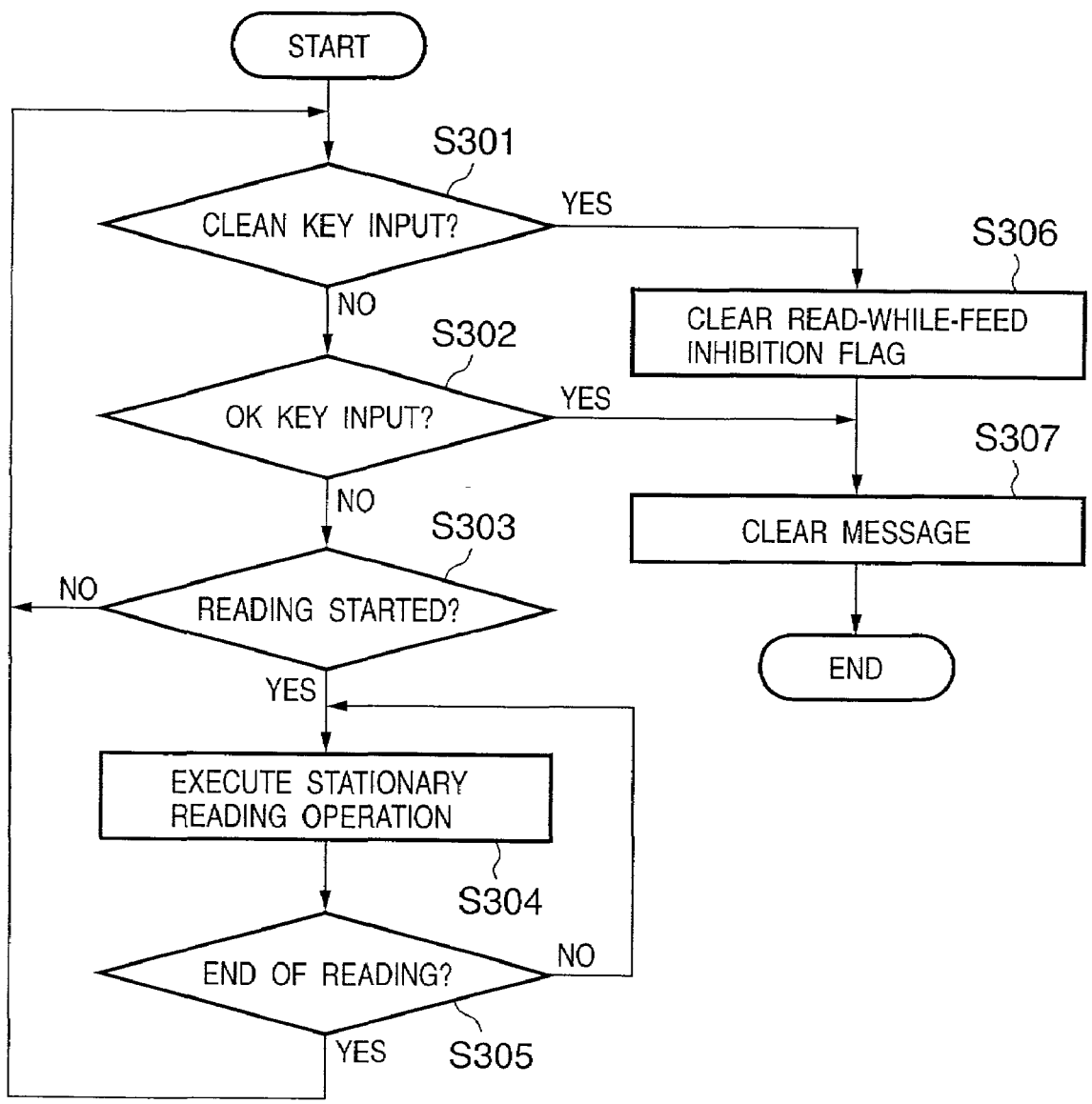
FIG. 26 is a flow chart for explaining the control method for the image reading apparatus according to the third embodiment of the present invention.

FIG. 26 is a flow chart showing a control example when the processing in FIG. 25 is ended while keeping the dust-presence message displayed. FIG. 26 shows a control method of clearing the message by user's key input. This control starts when the dust-presence message is displayed after the end of the reading operation.

First, it is determined in step S301 whether the clean key is input. If NO in step S301, the flow advances to step S302 to determine whether the OK key is input. If NO in step S302, the flow returns to step S301 to repeat the above processing.

If YES in step S301, it is determined that cleaning has been done. The flow advances to step S306 to clear the read-while-feed inhibition flag. After that, the flow advances to step S307 to clear the message, and the processing is ended.

If YES in step S302, it is determined that cleaning is not executed. The flow advances to step S307 to clear the message without clearing the read-while-feed inhibition flag, and the processing is ended. For the next reading, the reading mode can be re-set. When the reading operation is performed, the message is displayed again after the end of reading, as described with reference to FIG. 25.

With the above-described control, after the end of the reading operation by a read-while-feed operation, dust detection can be performed. In addition, if it is determined on the basis of the dust detection result that the flow scanning operation cannot be executed at any position, an alarm window as shown in FIG. 27 is displayed to set an alarm state, thereby preventing subsequent user operation from being continued.

As described above, according to the third embodiment, dirt on the surface of the conveyor belt is read, and the dust detection level is adjusted in accordance with the dirt level. With this processing, the influence of dust or dirt on the platen glass can be eliminated while ensuring a high original reading speed for the read-while-feed operation independent of the dirt on the conveyor belt surface. This prevents wasteful operation of re-executing original reading when the dust or dirt is read together with the original image, and improves the productivity of reading operation.

In the first to third embodiments, the flow scanning position is set at a position corresponding to the feed belt. However, the present invention is not limited to this, and any other position can be set as long as a read-while-feed operation can be executed at that position. For, e.g., a document feeder which does not use a feed belt but a feed roller, the present invention can be applied by setting the flow scanning position near a point where the feed roller abuts against the platen glass and reading the feed roller instead of the feed belt in dust detection.

<Other Embodiment>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts shown in FIGS. 13 or 17 and/or 22 or 24, 25 and 26 described in the embodiments.

Further, the present invention includes combinations of the aforesaid embodiments or technical elements disclosed therein.

The present invention is not limited to the above embodiments and various changes and modifications can be made within the spirit and scope of the present invention. Therefore to apprise the public of the scope of the present invention, the following claims are made.

What is claimed is:

1. An image reading apparatus comprising: a document feeder adapted to convey an original; an image sensor adapted to read the original conveyed to a platen by said document feeder; a controller adapted to control said image sensor to execute reading at a predetermined position a plurality of number of times without placing any original on the platen while driving an original convey member of said document feeder; an adder adapted to add for each pixel image data of the original convey member read the plurality of number of times; a memory adapted to store for each pixel the image data added by said adder; a determination unit adapted to determine a threshold value on the basis of the number of times of reading the original convey member and the image data stored in said memory; and a detector adapted to detect a presence/absence and position of dust and/or dirt on the platen on the basis of the threshold value and image data output from said image sensor without placing any original on the platen.

2. The apparatus according to claim 1, wherein when the image data has a value smaller than the threshold value, said detector determines that the dust or dirt is present.

3. The apparatus according to claim 1, wherein said determination unit determines the threshold value by subtracting a predetermined value from the image data stored in said memory.

4. The apparatus according to claim 1, wherein when the image data value stored in said memory is less than a specific value, said determination unit sets the threshold value to a predetermined value.

5. The apparatus according to claim 1 further comprising a resolution converter adapted to reduce a resolution of the image data output from said image sensor, wherein said adder adds the image data whose resolution is reduced by said resolution converter, and said memory has a capacity corresponding to the number of pixels of one line of the image data having the reduced resolution.

6. The apparatus according to claim 1 further comprising a grayscale converter adapted to reduce a grayscale level of the image data output from said image sensor, wherein said adder adds the image data whose grayscale level is reduced by said grayscale converter, and said memory has a capacity corresponding to the number of pixels of one line of the image data having the reduced grayscale level.

7. The apparatus according to claim 1, wherein when the dust or dirt is detected by said detector, said controller moves a position of said image sensor.

8. The apparatus according to claim 1, wherein the apparatus has a first reading mode in which a position of said image sensor is fixed, and the original is read while being conveying by said document feeder and a second reading mode in which the original is stationarily held on the platen and read while moving said image sensor, and when the dust or dirt is detected by said detector, said controller moves said image sensor to one of a plurality of predetermined positions, and when the dust or dirt is detected by said detector at all of the plurality of positions, said controller inhibits the first reading mode and sets the second reading mode.

9. The apparatus according to claim 8 further comprising a notification section adapted to notify a user of inhibition of the first reading mode.

10. The apparatus according to claim 8, wherein said controller permits the first reading mode in accordance with removal of the dust or dirt on the platen.

11. The apparatus according to claim 1 further comprising an image processing unit adapted to replace pixel data corresponding to a position of the detected dust or dirt with pixel data of a pixel position adjacent to the position of the dust or dirt.

12. The apparatus according to claim 1 further comprising an image processing unit adapted to replace pixel data corresponding to a position of the detected dust or dirt with pixel data input for an immediately preceding pixel.

13. A dust detection method in an image reading apparatus having a document feeder adapted to convey an original, and an image sensor adapted to read the original conveyed to a platen by the document feeder, comprising: controlling the image sensor to execute reading at a predetermined position a plurality of number of times without placing any original on the platen while driving an original convey member of the document feeder; adding for each pixel image data of the original convey member read the plurality of number of times; storing for each pixel the added image data in a memory; determining a threshold value on the basis of the number of times of reading the original convey member and the image data stored in the memory; and detecting a presence/absence and position of dust and/or dirt on the platen on the basis of the threshold value and image data output from the image sensor without placing any original on the platen.

14. The method according to claim 13, wherein upon detecting the presence/absence and position of dust and/or dirt, when the image data has a value smaller than the threshold value, it is determined that the dust or dirt is present.

15. The method according to claim 13, wherein the threshold value is determined by subtracting a predetermined value from the image data stored in the memory.

16. The method according to claim 13, wherein when the image data value stored in the memory is less than a specific value, the threshold value is set to a predetermined value.

17. The method according to claim 13 further comprising reducing a resolution of the image data output from the image sensor, wherein upon adding the image data, the image data having the reduced resolution is added, and the memory has a capacity corresponding to the number of pixels of one line of the image data having the reduced resolution.

18. The method according to claim 13 further comprising reducing a grayscale level of the image data output from the image sensor, wherein upon adding the image data, the image data having the reduced grayscale level is added, and the memory has a capacity corresponding to the number of pixels of one line of the image data having the reduced grayscale level.

19. A control method for the image reading apparatus which executes the dust detection method of claim 13, wherein when the dust or dirt is detected, a position of the image sensor is moved, and the dust detection method is repeatedly executed.

20. A control method for the image reading apparatus which executes the dust detection method of claim 13, wherein the image reading apparatus has a first reading mode in which a position of the image sensor is fixed, and the original is read while being conveyed by the document feeder and a second reading mode in which the original is stationarily held on the platen and read while moving the image sensor, and the method comprises: moving the image sensor to one of a plurality of predetermined positions when the dust or dirt is detected, and repeatedly executing the dust detection method, and inhibiting the first reading mode and setting the second reading mode when the dust or dirt is detected at all of the plurality of positions.

21. The method according to claim 20, characterized by further comprising notifying a user of inhibition of the first reading mode.

22. The method according to claim 20, characterized by further comprising permitting the first reading mode in accordance with removal of the dust or dirt of the platen.

23. An image processing method in the image reading apparatus which executes the dust detection method of claim 13, comprising replacing pixel data corresponding to a position of the detected dust or dirt with pixel data of a pixel position adjacent to the position of the dust or dirt.

24. An image processing method in the image reading apparatus which executes the dust detection method of claim 13, comprising replacing pixel data corresponding to a position of the detected dust or dirt with pixel data input for an immediately preceding pixel.

25. A computer program product comprising a computer readable medium having computer readable program code embodied in said medium for a control method for the image reading apparatus which executes the dust detection method of claim 13, said product including: first computer readable program code for moving a position of the image sensor when the dust or dirt is detected; and second computer readable program code for repeating the dust detection method.

26. A computer program product comprising a computer readable medium having computer readable program code embodied in said medium for a control method for the image reading apparatus which executes the dust detection method of claim 13, wherein the image reading apparatus has a first reading mode in which a position of the image sensor is fixed, and the original is read while being conveyed by the document feeder and a second reading mode in which the original is stationarily held on the platen and read while moving the image sensor, said product including: first computer readable program code for moving the image sensor to one of a plurality of predetermined positions when the dust or dirt is detected, and repeatedly executing the dust detection method, and second computer readable program code for inhibiting the first reading mode and setting the second reading mode when the dust or dirt is detected at all of the plurality of positions.

27. A computer program product comprising a computer readable medium having computer readable program code embodied in said medium for an image processing method in the image reading apparatus which executes the dust detection method of claim 13, said product including: computer readable program code for replacing pixel data corresponding to a position of the detected dust or dirt with pixel data of a pixel position adjacent to the position of the dust or dirt.

28. A computer program product comprising a computer readable medium having computer readable program code embodied in said medium for an image processing method in the image reading apparatus which executes the dust detection method of claim 13, said product including: computer readable program code for replacing pixel data corresponding to a position of the detected dust or dirt with pixel data input for an immediately proceding pixel.

29. A computer program product comprising a computer readable medium having computer readable program code embodied in said medium for a dust detection method in an image reading apparatus having a document feeder adapted to convey an original, and an image sensor adapted to read the original conveyed to a platen by the document feeder, said product including: first computer readable program code for controlling the image sensor to execute reading at a predetermined position a plurality of number of times without placing any original on the platen while driving an original convey member of the document feeder; second computer readable program code for adding for each pixel image data of the original convey member read the plurality of number of times; third computer readable program code for storing for each pixel the added image data in a memory; fourth computer readable program code for determining a threshold value on the basis of the number of times of reading the original convey member and the image data stored in the memory; and fifth computer readable program code for detecting a presence/absence and position of dust and/or dirt on the platen on the basis of the threshold value and image data output from the image sensor without placing any original on the platen.

* * * * *